(12) United States Patent
Ukelson et al.

(10) Patent No.: US 7,721,270 B2
(45) Date of Patent: May 18, 2010

(54) INFORMATION CONVERTER AND A METHOD FOR TRANSFORMING INFORMATION

(75) Inventors: Jacob Paul Ukelson, Tel Aviv (IL); Shabtay Gertzek, Nahariya (IL); Avri Sela, Kfar Vradim (IL); Amir Shub, Raanana (IL); Tse'elon Ben-Barak, Tel Aviv (IL)

(73) Assignee: Informatica Corporation, Redwood City, CA (US)

( * ) Notice: Subject to any disclaimer, the term of this patent is extended or adjusted under 35 U.S.C. 154(b) by 1244 days.

(21) Appl. No.: 11/238,583

(22) Filed: Sep. 29, 2005

(65) Prior Publication Data

US 2007/0028221 A1 Feb. 1, 2007

Related U.S. Application Data

(60) Provisional application No. 60/702,889, filed on Jul. 26, 2005.

(51) Int. Cl.
G06F 9/44 (2006.01)
(52) U.S. Cl. ...................................... 717/136
(58) Field of Classification Search .......... 717/136–137
See application file for complete search history.

(56) References Cited

U.S. PATENT DOCUMENTS

| | | | | |
|---|---|---|---|---|
| 6,613,098 | B1 * | 9/2003 | Sorge et al. ................. | 715/234 |
| 7,415,672 | B1 * | 8/2008 | Fortini et al. ................ | 715/760 |
| 7,480,856 | B2 * | 1/2009 | Jones .......................... | 715/234 |
| 7,516,145 | B2 * | 4/2009 | Sikchi et al. ................ | 707/102 |
| 7,546,590 | B2 * | 6/2009 | Stone et al. .................. | 717/137 |
| 7,627,861 | B2 * | 12/2009 | Smith et al. ................. | 717/144 |
| 2001/0044811 | A1 * | 11/2001 | Ballantyne et al. .......... | 707/513 |
| 2003/0226105 | A1 * | 12/2003 | Waldau ....................... | 715/503 |
| 2004/0015840 | A1 * | 1/2004 | Walker ........................ | 717/108 |
| 2004/0181748 | A1 * | 9/2004 | Jamshidi et al. ............. | 715/503 |
| 2004/0205551 | A1 * | 10/2004 | Santos ......................... | 715/513 |
| 2004/0216086 | A1 * | 10/2004 | Bau ............................ | 717/114 |
| 2005/0028143 | A1 * | 2/2005 | Aridor et al. ................ | 717/122 |
| 2005/0039113 | A1 * | 2/2005 | Balducci et al. ............. | 715/503 |
| 2005/0257193 | A1 * | 11/2005 | Falk et al. ................... | 717/109 |
| 2006/0179421 | A1 * | 8/2006 | Bielski et al. ............... | 717/115 |
| 2006/0265689 | A1 * | 11/2006 | Kuznetsov et al. .......... | 717/117 |
| 2007/0256055 | A1 * | 11/2007 | Herscu ........................ | 717/115 |
| 2009/0138790 | A1 * | 5/2009 | Larcheveque et al. ....... | 715/224 |

OTHER PUBLICATIONS

Bernstein, P.A., et al., "Industrial-Strength Schema Matching," Sigmod Record, Dec. 2004, pp. 38-43, vol. 33, No. 4.

* cited by examiner

*Primary Examiner*—Wei Y Zhen
*Assistant Examiner*—Anna Deng
(74) *Attorney, Agent, or Firm*—Fenwick & West LLP

(57) ABSTRACT

An information converter includes: an input for receiving non-structured information transformation specification and a processor. The processor is adapted to (i) convert the non-structured information transformation specification to a structured information transformation specification; (ii) generate information transformation code responsive to the structured information transformation specification; and (iii) associate a code alteration indication to the non-structured information transformation specification in response to an alteration of the information transformation code. A method and a computer readable medium converts the non-structured information transformation specification to a structured information transformation specification; generates information transformation code responsive to the structured information transformation specification, and associates a code alteration indication to the non-structured information transformation specification in response to an alteration of the information transformation code.

27 Claims, 13 Drawing Sheets

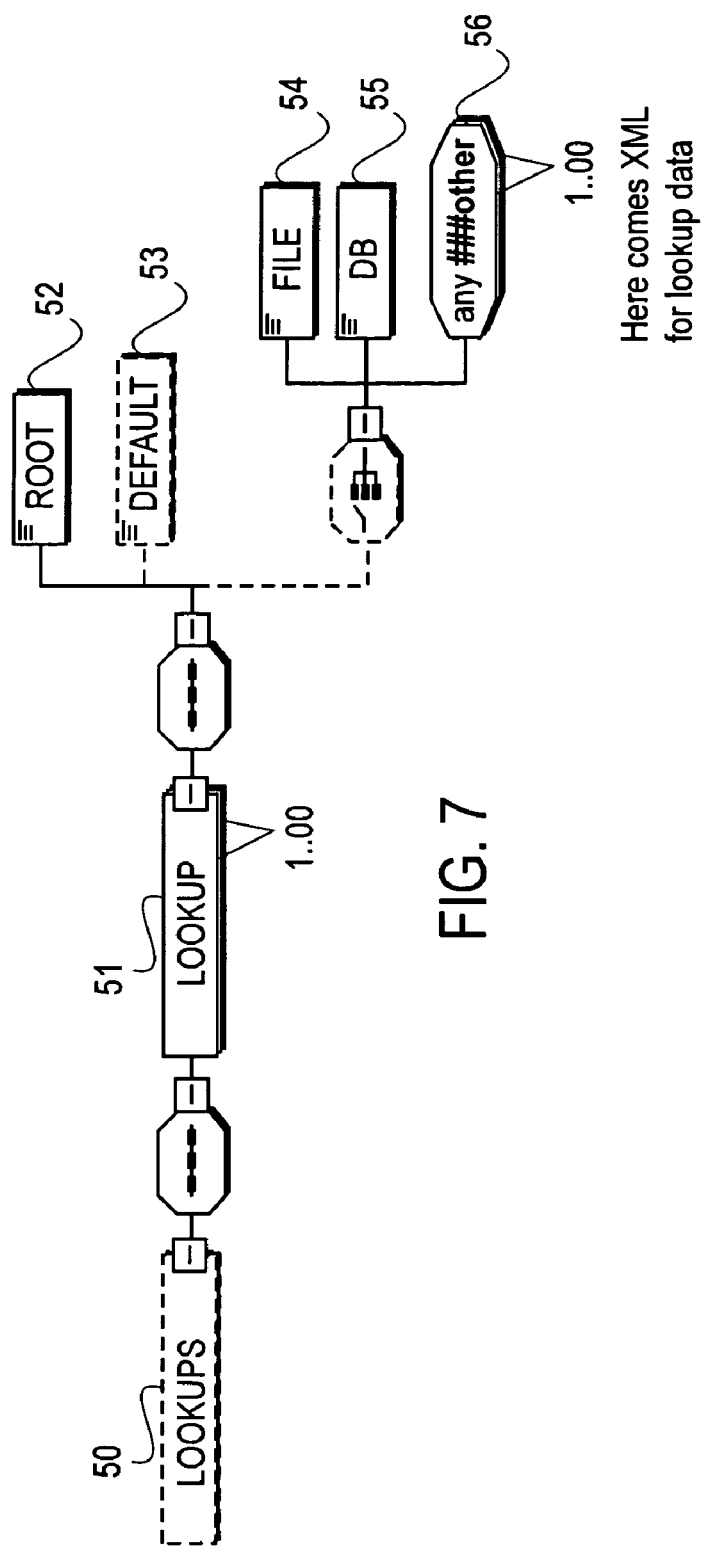
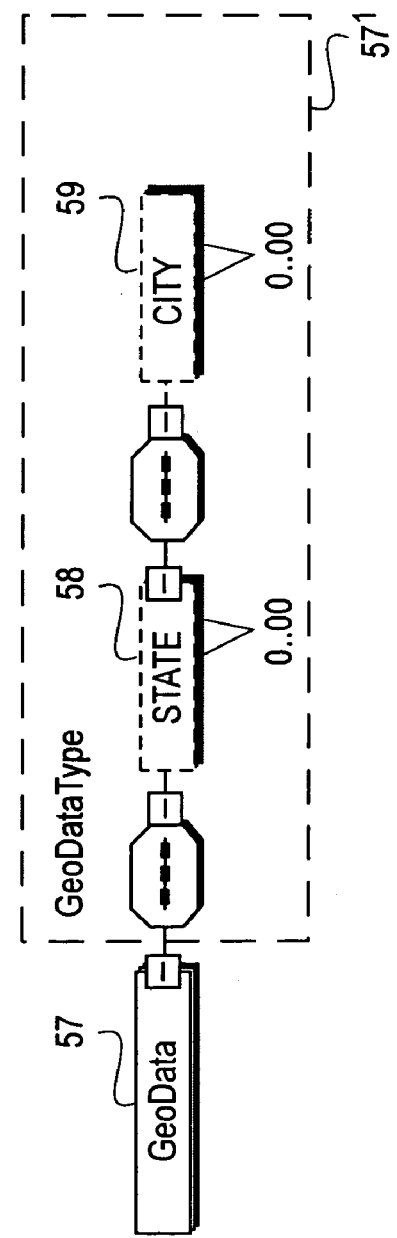
FIG. 7
FIG. 8

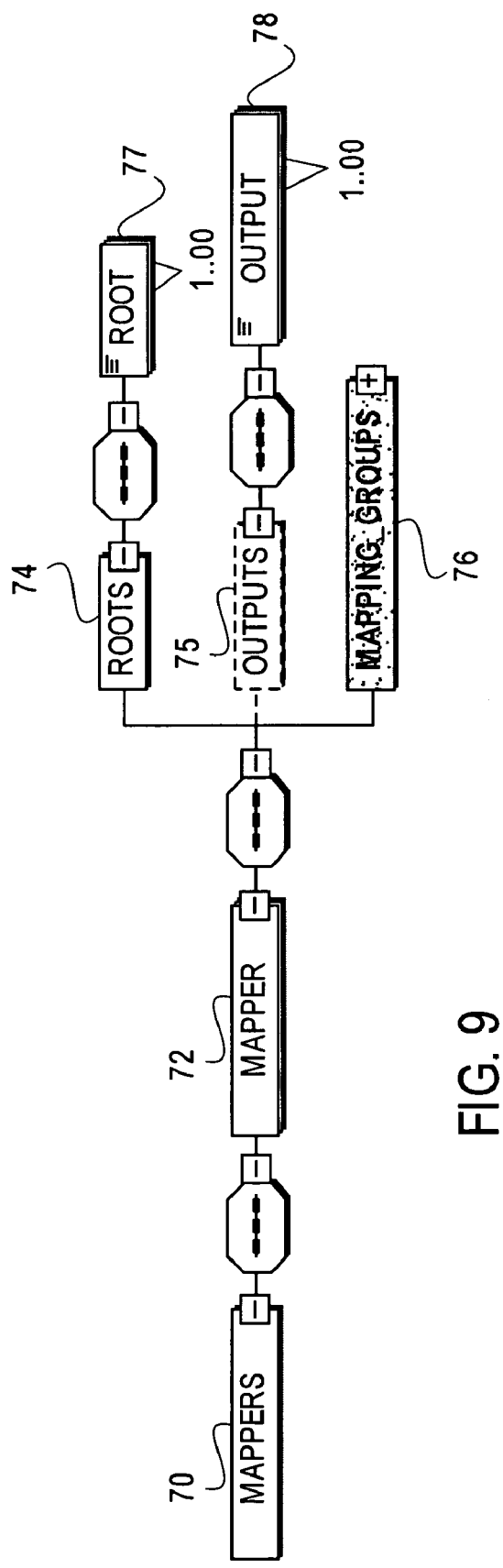
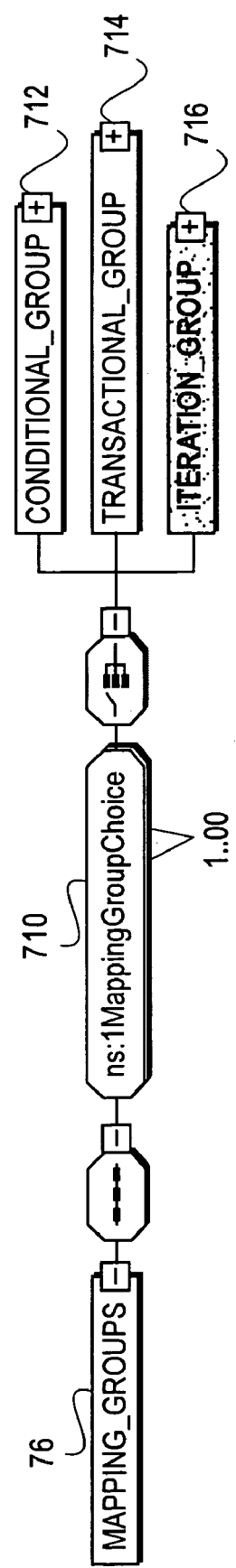
FIG. 9
FIG. 10

INFORMATION CONVERTER AND A METHOD FOR TRANSFORMING INFORMATION

RELATED APPLICATIONS

This application claims the benefit of U.S. Provisional Application No. 60/702,889, filed Jul. 26, 2005, the content of which is incorporated herein by reference.

FIELD OF THE INVENTION

Method and computer readable medium for transforming information and information converters and especially methods for defining information transformations using structured and non-structured information translation specifications.

BACKGROUND OF THE INVENTION

Specification based transformation allows business analysts, information analysts or system analysts to create an executable specification of the transformation needed for EAI (Enterprise Application Integration). The specification needs to be simple enough for analysts to use, while still being rigorous enough to allow execution The current state of the art is that analysts create non-structured information transformation specifications using various software tools such as but not limited to Microsoft™ Word™ and Microsoft Excel™.

These non-structured information transformation specifications are then passed to programmers which develop code that performs the information transformation that is defined in the non-structured information specification.

The code can be developed by using a unique mapping tool provided by their EAI server vendor (e.g. IBM™ or Webmethods™), or by programming the code. In many cases the programmers use a mixture of mapping tools and programming.

This dual stage process usually results in inconsistencies. Typically changes to the implementation code are not reflected back to the specification s and eventually the code does not accurately represent the initial non-structured specification.

There is a need to perform information transformation while maintaining a correlations between the transformation code and the non-structured information transformation specification. Especially, there is a need to allow both programmer and analyst to use the tools they are used to without introducing inconsistencies between the information transformation code and the non-structured information transformation specification.

SUMMARY OF THE INVENTION

An information converter that includes: an input for receiving non-structured information transformation specification and a processor. The processor is adapted to (i) convert the non-structured information transformation specification to a structured information transformation specification; (ii) generate information transformation code responsive to the structured information transformation specification; and (iii) associate a code alteration indication to the non-structured information transformation specification, in response to an alteration of the information transformation code.

A computer readable medium that stored code that when executed by a processor causes the computer to: (i) convert the non-structured information transformation specification to a structured information transformation specification; (ii) generate information transformation code responsive to the structured information transformation specification, and (iii) associate a code alteration indication in response to an alteration of the information transformation code.

A method for converting information, the method includes: converting a non-structured information transformation specification to a structured information transformation specification; generating information transformation code responsive to the structured information transformation specification; and associating a code alteration indication to the non-structured information transformation specification in response to an alteration of the information transformation code.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 7 illustrates an exemplary LOOKUP element and its child elements, according to an embodiment of the invention;

FIG. 8 illustrates an exemplary LOOKUP structure, according to an embodiment of the invention;

FIG. 9 illustrates an exemplary MAPPERS element and its child elements, according to an embodiment of the invention;

FIG. 10 illustrates a MAPPING_GROUPS element and its child elements, according to an embodiment of the invention;

DETAILED DESCRIPTION OF THE INVENTION

Figure 1:
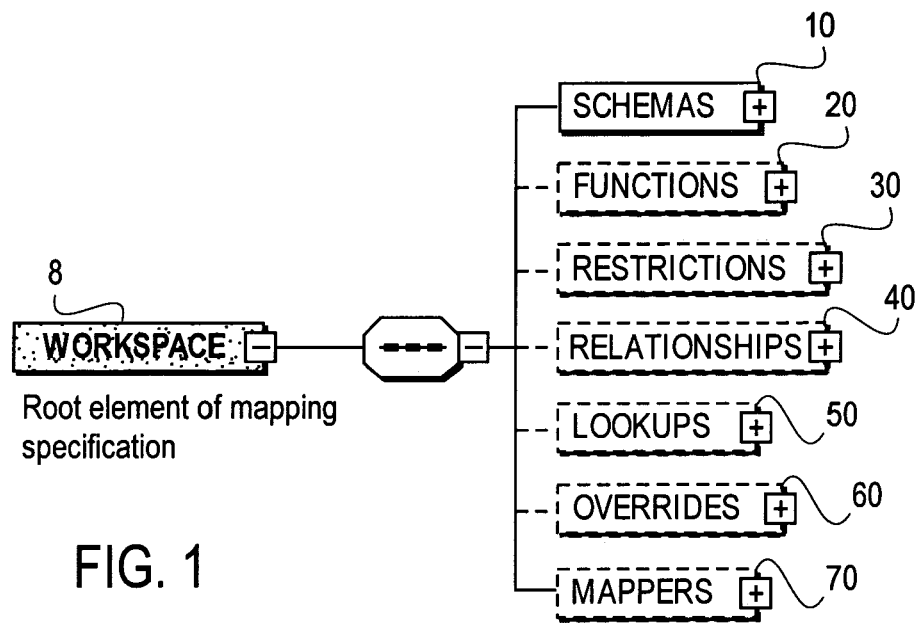
FIG. 1 illustrates a WORKPLACE element and its child elements, according to an embodiment of the invention.

The invention allows to convert non-structured information transformation specifications to information transformation code and vice verse, while tracking information transformation specifications alterations and tracking information transformation code alterations.

The non-structured information transformation specification can have various formats. It is typically a spreadsheet format. It can also include semi-structured format. For example, it can be generated using a table GUI, excel software, or another tool. The information transformation code can have various formats such as but not limited to Content-Master, XSLT, Java, C and the like.

The invention provides methods, information converters and computer readable medium. According to an embodiment of the invention they can be adapted to ease the creation of the non-structured information transformation specification. For example, the method can include a stage of providing indications of recommended non-structured information transformation specification rules. Conveniently, the method can include a stage of generating non-structured information transformation specification shortcuts.

Yet for another example, the method can help with the selection of source and\or target through various UI metaphors such as name auto-completion based on the source or target schemas, facilitate viewing and selecting of the source and\or target as a graphical structure, allow to drag and between the source and target graphical structures or between the source\target and the mapping specification. The method can also ensure that simple mistakes in mapping are eliminated, for example they can ensure that the source contains only legal elements from the source structure and that the target contains only legal elements from the structure According to one embodiment of the invention the non-structured information transformation specifications includes a map which describes how a value (constant, computed or structure) is inserted into a location in the target structure. An element in a structure is described by its xpath in the source or target structure. For example, an xpath can be defined as a single column in the spreadsheet that defines its location in the spreadsheet, or may be divided into multiple columns which when concatenated by a defined rule may describe the location in the structure. It may also be described as the source xpath in a word document or PDF. A specification can also use a syntax natural to the specification to access information (e.g. reference to a cell in a spreadsheet, reference to a figure in a document).

Conveniently, the structure of a map includes the following components: source, default value, target location, condition, translation/lookup, grouping mechanism, dynamic lookup table and cardinality.

The source is described by an element in the source structure or a value (either static or computed). The default value can be used as the value to be placed in the target structure if the source element is null. The target location is described by an element in the source structure. A condition can include a precondition and a post-condition. A precondition is evaluated on original value, a post-condition is evaluated on the value after translation.

The translation\lookup is an expression that modifies the value (either through computation, or static lookup in another spreadsheet). The grouping mechanism allows mappings to be aggregate together in a group. The dynamic lookup table is based on source mechanism. It allows lookup tables to be created from value in the specifications (e.g. an appendix in a document, another spreadsheet).

The cardinality enables mapping a complex element to another complex element, where the cardinality of the target element is different from the cardinality of the source element. The change in cardinality is indicated by this column. If the cardinality column is empty, the default is "First". Conveniently, the possible values of a cardinality column include: each, first, last, Nth, any, By_Key, and By_Function.

If the cardinality value is "each" then for each source element create a target element in the information. If the cardinality value is "first" then the process creates only a target element appropriate for the first source element in the source information. If the cardinality value is "last" then the process creates a target element appropriate for the last source element in the source information. If the cardinality value is "Nth" then the process creates a target element appropriate for the nth source element in the source information. If the cardinality value is "any" then the process selects a random source element and use it to create a target element.

If the cardinality value is "By_Key" then the process maps a complex element to another complex element, by a key in the input element. The number of relevant elements in the target may be equal to the number of unique input elements. For example, everyone with the same department in a source element gets mapped into the same target element. The atomic unit should also contain a simple mapping row defining an element as a key.

If the cardinality value is "By_Function" then the process Maps a complex element to another complex element, as a function of the input element. The number of relevant elements in the target may be equal to the number of unique input elements as computed by the function. For example, "Average" could be a function that returns only one new source element, the one which denotes the average value. The actual function is named in the "translation" column.

According to various embodiments of the invention: (i) a source value can be modified by an expression (e.g. lookup table) before being mapped to the target, (ii) a basic map may be conditional on the value, either the original value or after modification, (ii) the ordering of the basic maps has no significance, (iii) the specification allows for the description of transactional group where a failure of any map causes all of the maps in a group to fail, (iv) the specification allows for the description of conditional groups where when a map fails the next map is executed until one mapping is successful within the group, then processing of that group is complete, (v) the specification allows for the description of iteration groups. An iteration group describes how to map a source structure with cardinality greater than one to a target structure. It allows the mapping to specify different grouping and plurality (cardinality) of source elements then that described by the source structure. If the map does not contain an iteration group for mapping a target structure with a target structure greater than one, an algorithm is used to find the legal mapping based on source and target cardinality, or a heuristic is used to find the best mapping which is validated with the user.

According to other various embodiments of the invention: (i) the target location van include one or more columns, (ii) the condition once evaluated may be true or fault, (iii) a spreadsheet or structure syntax can be used to access information, (iv) single maps or group can be named for a designation, error reporting or reuse purposes, (v) a specification may contain only a subset of a map constituent component, in which case the map may be executable with only specific information instances or must be augmented by a programmer, (vi) a simple specification should include source and target columns.

Conveniently, a non-structured information transformation specification that is provided as a spreadsheet typically also includes: (i) metadata sheet describing the source XSD, target XSD, authors etc.; (ii) which cleansing and enrichment algorithms are applicable to the input; (iii) parsing sheet source description sheet; (iv) mapping sheet, and (v) reverse mapping sheet. Additional spreadsheets can include a serializing sheet, a sequencing sheet, an "input examples" sheet and a result sheet for testing the specified transformation, and the like.

According to the various embodiments of the invention there may be provided a set of tools that ease the creation of the mapping. These tools help with the selection of source and\or target through various UI metaphors such as name auto-completion based on the source or target schemas, allowing viewing and selection of the source and\or target as a graphical structure, allowing drag and between the source and target graphical structures or between the source\target and the mapping specification in order to create a new map, or modify an existing map. The tools can also ensure that simple mistakes in mapping are eliminated, for example they can ensure that the source contains only legal elements from the source structure and that the target contains only legal elements from the structure.

According to an embodiment of the invention the structured information transformation specification has an XML format of a derivative of the XML formal, such as mXML, or other formats such as CAM by Oasis. Conveniently, the structured information transformation specification is also referred to as scheme.

Figure 20:
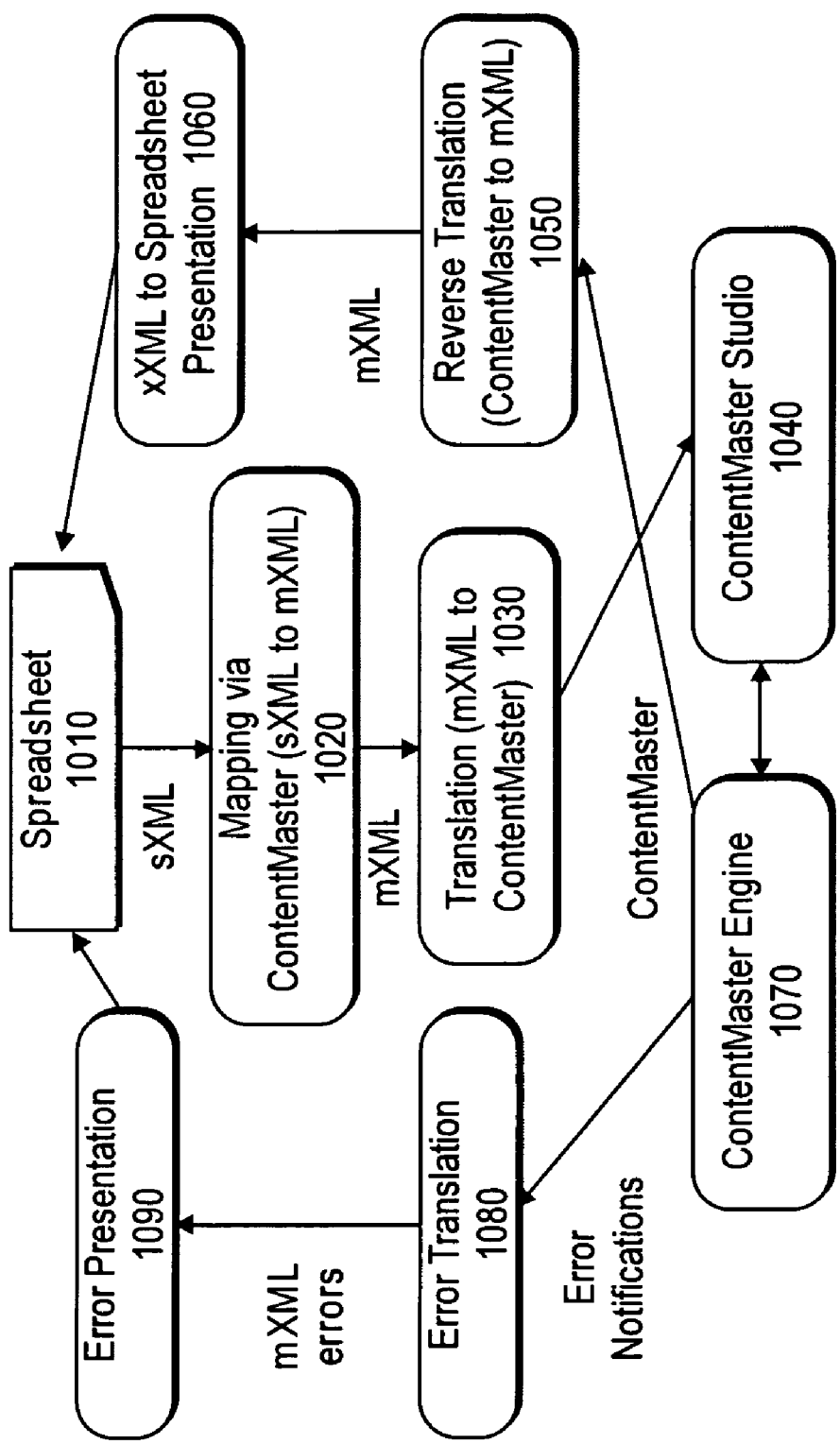
FIG. 20 illustrates an exemplary implementation of method, according to an embodiment of the invention.

The information transformation code can be generated in various manners known in the art, as well as according to various embodiments of the invention. FIG. 20 illustrates an exemplary method while FIGS. 1-18 illustrates examples of a structured information transformation specification.

FIG. 1 illustrates a WORKPLACE element 8 and its child elements 10-70, according to an embodiment of the invention.

Conveniently, the WORKSPACE element 8 is a root element and can have the following child elements: SCHEMAS, FUNCTIONS, RESTRICTIONS, RELATIONSHIPS, LOOKUPS, OVERRIDES and MAPPERS.

FIG. 1 illustrates a the WORKSPACE element 8 and its child elements: SCHEMAS 10, FUNCTIONS 20, RESTRICTIONS 30, RELATIONSHIPS 40, LOOKUPS 50, OVERRIDES 60 and MAPPERS 70.

TABLE 1 describes the attributes of the WORKSPACE 8 element:

TABLE 1

WORKSPACE Attributes

| Attribute | Type | Use | Description |
| --- | --- | --- | --- |
| name | NCName | required | Descriptive name of the workspace. For use in future features such as back propagation. |
| URL[1] | anyURI | optional | Name of the file containing the workspace. For use in future features such as back propagation. |
| sourceType | CM_EXCEL | required | Specifies which expression parser to use |

TABLE 1-continued

WORKSPACE Attributes

| Attribute | Type | Use | Description |
| --- | --- | --- | --- |
| sourceFormat | string | optional | The format of the original input (e.g. a spreadsheet cell). For use in future features such as back propagation. |

Figure 2:
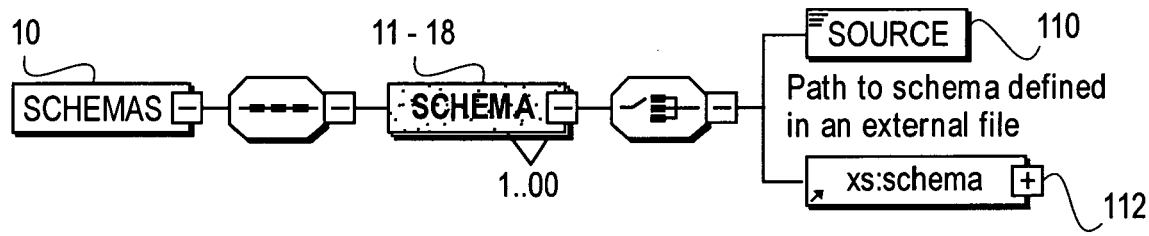
FIG. 2 illustrates a SCHEMAS element and its child elements, according to an embodiment of the invention.

FIG. 2 illustrates a the SCHEMAS element 10 and its child elements, according to an embodiment of the invention.

SCHEMAS 10 conveniently describes all schemas used in the mapping specification. Each schema is described by a SCHEMA element such as SCHEMA 11. SCHEMAS element 10 can include multiple SCHEM elements (such as elements 11-18), and each SCHEMA element (for example SCMEMA element 11) includes a source 110 and a name (such as xs:schema) 112.

TABLE 2 describes the attributes of a SCHEMA element 11:

TABLE 2

SCHEMA Attributes

| Attribute | Type | Use | Description |
| --- | --- | --- | --- |
| Id | string | optional | GUID identifying the element. For use in future features such as back propagation. |
| source | String | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | String | optional | Provides user-specific description of the element. |
| name | NCName | required | Provides schema identifier to be used in error messages and as a prefix for ambiguous XPaths |

Conveniently, the SCHEMA element can describe an input schema, an output schema or a lookup schema. Conveniently, a SCHEMA element can be specified in one of two ways: (i) by using the SOURCE element to specify the schema URL. If the URL is a relative file path, the program looks for the schema in the same directory as the input XML. The ".xsd" extension is optional. (ii) By using "xs:schema" element to specify the schema definition inline.

An exemplary SCHEMAS element 20, that includes three SCHEMA elements ("INPUT" schema that is specified using SOURCE element, "OUPUT" schema that is specified using SOURCE element, and a "Lookup" schema that is specified inline) is illustrated below:

```
<SCHEMAS>
  <SCHEMA name="INPUT">
    <SOURCE>Schema1</SOURCE>
  </SCHEMA>
  <SCHEMA name="OUTPUT">
    <SOURCE>Schema2</SOURCE>
  </SCHEMA>
```

-continued

```
<SCHEMA NAME="LOOKUP">
    <xs:schema targetNamespace="http://www.itefield.com/
    ContentMaster/MapperLookup"
    xmlns="http://www.itefield.com/ContentMaster/MapperLookup"
    attributeFormDefault="qualified"
    elementFormDefault="qualified" xmlns:xs="http://www.w3.org/
    2001/XMLSchema">
        <xs:complexType name="LookupType">
            <xs:sequence>
                <xs:element maxOccurs="unbounded"
                    name="LOOKUP_ENTRY">
                    <xs:complexType>
                        <xs:attribute name="input"/>
                        <xs:attribute name="output"/>
                    </xs:complexType>
                </xs:element>
            </xs:sequence>
        </xs:complexType>
        <xs:element name="LOOKUP" type="LookupType"/>
    </xs:schema>
</SCHEMA>
</SCHEMAS>
```

Figure 3:
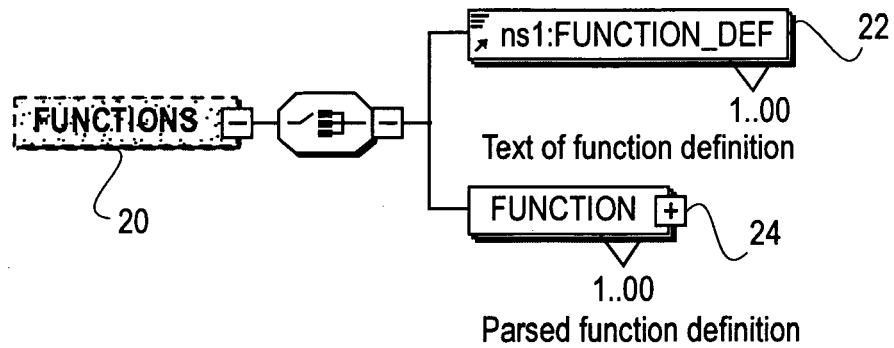
FIG. 3 illustrates FUNCTIONS element and its child elements, according to an embodiment of the invention.

FIG. 3 illustrates FUNCTIONS element 30 and its child elements, according to an embodiment of the invention. FUNCTIONS element 30 is linked to one or more FUNCTION element 24 and to ns:FUNCTION_DEF elements 22.

Figure 4:
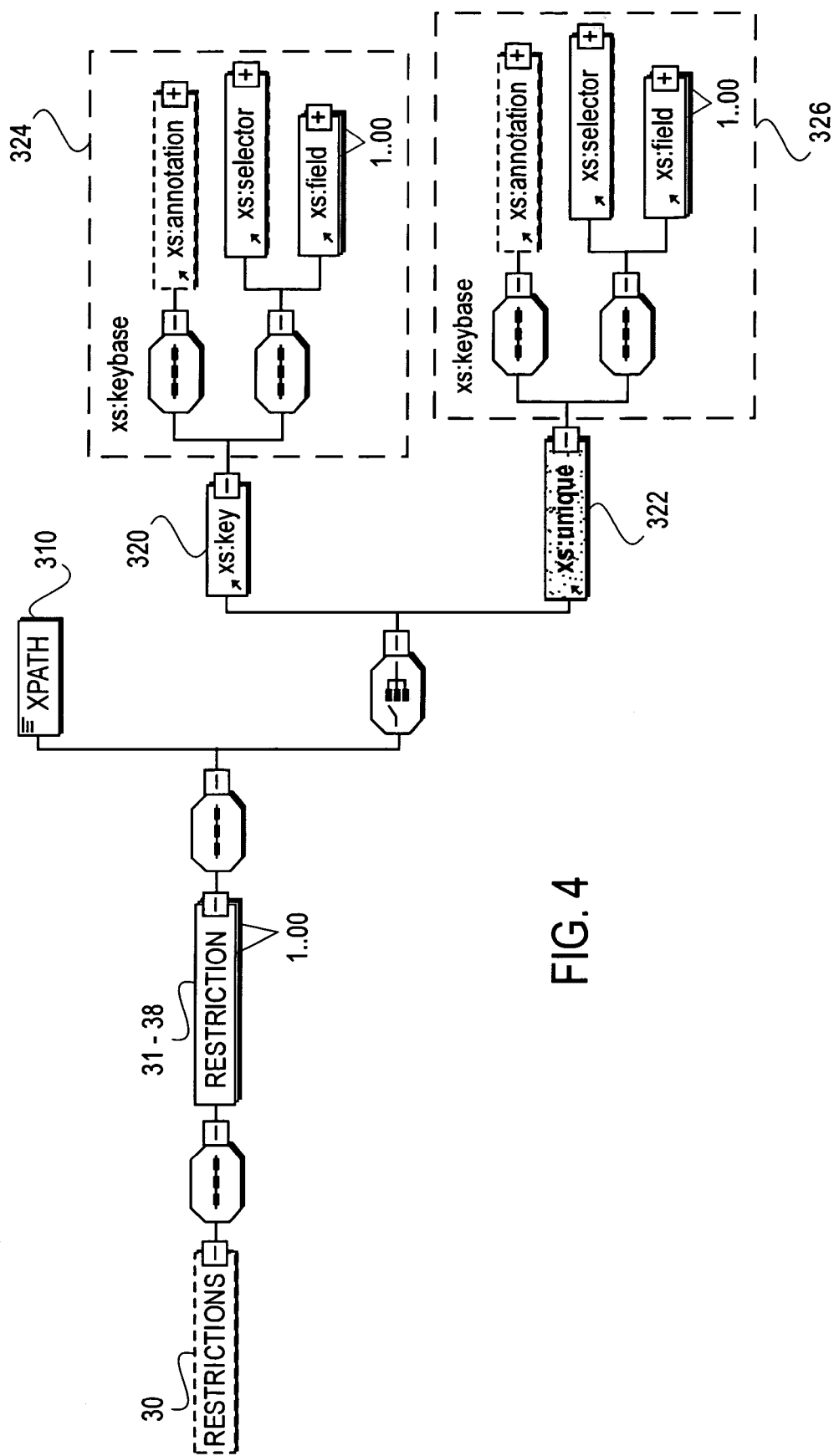
FIG. 4 illustrates the RESTRICTIONS element and its child elements according to an embodiment of the invention.

FIG. 4 illustrates the RESTRICTIONS 40 element and its child elements according to an embodiment of the invention.

The RESTRICTIONS element 40 describes the schema restrictions used in a certain mapping specification. Schema restrictions are XSD elements that constraint the schema definition.

For convenience of explanation only a key type constraint ("xs:key") and unique type constraint ("xs:unique") are illustrated. It is noted that this elements is not limited to these two identity restrictions but can also include, for example, various restrictions and specific facets on defined restriction.

Conveniently, restrictions should be specified on a schema. In practice, however, there are situations where restrictions are needed only for specific mapping specification. In such cases the RESTRICTIONS element should be used. Conveniently, each schema restriction is described by a RESTRICTION element.

TABLE 3 describes the attributes of the RESTRICTION element:

TABLE 3

RESTRICTION Attributes

| Attribute | Type | Use | Description |
|---|---|---|---|
| Id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the restriction. |
| name | NCName | required | Provides an identifier to be used in error messages and in construction of CONTENTMASTER objects that are generated based on this restriction. |

TABLE 3-continued

RESTRICTION Attributes

| Attribute | Type | Use | Description |
|---|---|---|---|
| op | add delete replace | required | "add" specifies that a child element is added "delete" specifies that a child element is removed "replace" specifies that the element definition is replaced |

As illustrated in FIG. 4, a RESTRICTION element includes two components: (i) a parent path specified using XPATH element, and (ii) a next element is an XSD definition of the restriction.

Restrictions define restrictions that are imposed on the XSD or the mapping. For example, an element can be allowed to be unique only, thus preventing children elements with the same values. These restrictions may result as a function of the schema (the schema allows only unique elements) or because of the mapping. Another restriction is "key" which means that you can use the value of an element to find it and its siblings\subtree quickly.

RESTRICTIONS element 30 is linked to multiple RESTRICTION elements 31-38. Each RESTRICTION element (for example element 31) is linked to an XPATH (310) and to various elements such as key element 320 and unique element 322. The key element 320 can be linked to (include limitations relating to) various elements (collectively denoted 324) such as annotation, selector and field elements. The unique element 322 can be linked to (include limitations relating to) various elements (collectively denoted 326) such as annotation, selector and field elements.

TABLE 4 describes the attributes of the XPATH element:

TABLE 4

XPATH Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the XPATH. |
| schema | NCName | optional | Specifies the name of the schema the path belongs to. Should be used to resolve ambiguities between schemas with similar paths, as may occur in mapping between different versions of the same schema. |

An exemplary RESTRICTIONS element is provided below:

```
<xs:schema xmlns:xs="http://www.w3.org/2001/XMLSchema"
elementFormDefault="qualified" attributeFormDefault="unqualified">
    <xs:element name="OUTPUT_RECORDS">
        <xs:complexType>
            <XS:SEQUENCE>
                <xs:element name="OUTPUT_RECORD1" minOccurs="0"
maxOccurs="unbounded">
                    <xs:complexType>
                        <xs:sequence>
                            <xs:element name="OUTPUT_RECORD2"
                            maxOccurs="unbounded">
                                <xs:complexType>
                                    <xs:sequence>
                                        <xs:element name="OUTPUT_RECORD3"
maxOccurs="unbounded">
                                            <xs:complexType>
                                                <xs:attribute name="a3"/>
                                            </xs:complexType>
                                        </xs:element>
                                    </xs:sequence>
                                    <xs:attribute name="a2"/>
                                </xs:complexType>
                            </xs:element>
                        </xs:sequence>
                        <xs:attribute name="a1"/>
                    </xs:complexType>
                </xs:element>
            </xs:sequence>
        </xs:complexType>
    </xs:element>
</xs:schema>
```

Figure 5:
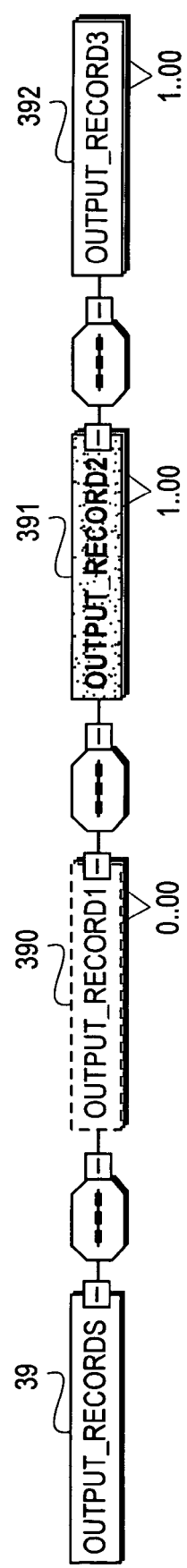
FIG. 5 illustrates an exemplary RESTRICTIONS element and its child elements, according to an embodiment of the invention.

FIG. 5 illustrates an exemplary RESTRICTIONS element and its child elements, according to an embodiment of the invention.

A parent element is linked to one or more OUTPUT_RECORD1 elements 390 that in turn are linked to one or more OUTPUT_RECORD2 elements 391 that are linked to one or more OUTPUT_RECORD3 elements 392. The mapping specification requires that the OUTPUT_RECORD1 elements 391 should be grouped based on the value of a1 attribute, while the OUTPUT_RECORD2 elements 392 should be grouped based on the value of a2 attribute inside OUTPUT_RECORD1 elements 391.

This requires addition of two key schema elements: one to specify the first grouping, and second to specify the second grouping. The parent of the first grouping is \OUTPUT_RECORDS, which provides the uniqueness scope for a1. The key element selector is OUTPUT_RECORD1, the unique element in this grouping. The fields list contains only @a1, which provides the key value. The resulting restriction is defined as follows:

```
<RESTRICTION name="UniqueA1" op="add">
    <XPATH>/OUTPUT_RECORDS</XPATH>
    <xs:key name="UniqueA1">
        <xs:selector xpath="OUTPUT_RECORD1"/>
        <xs:field xpath="@a1"/>
    </xs:key>
</RESTRICTION>
```

The second RESTRICTION element is constructed in a similar manner. The resulting RESTRICTIONS element looks as follows:

```
<RESTRICTIONs>
    <RESTRICTION name="UniqueA1" op="add">
        <XPATH>/OUTPUT_RECORDS</XPATH>
        <xs:key name="UniqueA1">
            <xs:selector xpath="OUTPUT_RECORD1"/>
            <xs:field xpath="@a1"/>
        </xs:key>
    </RESTRICTION>
    <RESTRICTION name="UniqueA2" op="add">
        <XPATH>/OUTPUT_RECORDS/OUTPUT_RECORD1</XPATH>
        <xs:key name="UniqueA2">
            <xs:selector xpath="OUTPUT_RECORD2"/>
            <xs:field xpath="@a2"/>
        </xs:key>
    </RESTRICTION>
</RESTRICTIONs>
```

Figure 6:
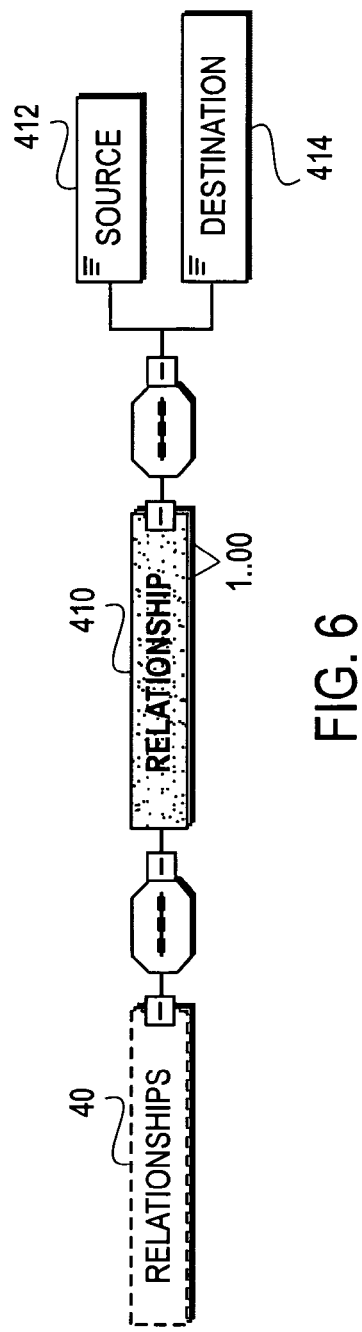
FIG. 6 illustrates an exemplary RELATIONSHIPS element and its child elements, according to an embodiment of the invention.

FIG. 6 illustrates an exemplary RELATIONSHIPS element and its child elements, according to an embodiment of the invention. A parent RELATIONSHIPS element 40 is linked to one or more RELATIONSHIP elements 410 and each RELATIONSHIP element 410 is linked to a SOURCE element 412 and to a DESTINATION element 414.

FIG. 7 illustrates an exemplary LOOKUP element and its child elements, according to an embodiment of the invention. LOOKUPS element 50 is linked to one or more LOOKPU element 51. Each LOOKUP element 51 can be linked to ROOT element 52, a DEFAULT element 43, a FILE element 54, a DB element 55 and to one or more additional elements (referred to as any ##other element) 56.

Conveniently, a LOOKUP element 51 is contained in an XML file with path specified by the FILE element 54, or originates from a information base with retrieval parameters specified by the DB element 55, or is explicitly specified by in-line XML. The optional DEFAULT element 43 allows to specify the value returned by the LOOKUP( ) function in case the input value is not found.

TABLE 5 describes the attributes of the LOOKUP element:

TABLE 5

| Attribute | Type | Use | Description |
|---|---|---|---|
| LOOKUP Attributes | | | |
| Id | string | optional | GUID identifying the element. For use in future features such as back propagation. |
| Source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the lookup. |
| name | NCName | required | Provides a unique identifier of the lookup to be used in invocation of the LOOKUP( ) function and in error messages. |

The ROOT element 52 identifies a global element in the XML schema that describes the lookup XML. The schema should be defined under the SCHEMAS element.

TABLE 6 describes the attributes of the ROOT element:

TABLE 6

ROOT Attributes

| Attribute | Type | Use | Description |
|---|---|---|---|
| id | string | Optional | GUID identifying the element. For use in future features such as back propagation. |
| source | string | Optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | Optional | Provides user-specific description of the ROOT. |
| schema | NCName | Optional | Specifies the name of the schema the path belongs to. Should be used to resolve ambiguities between schemas with similar paths, as may occur in mapping between different versions of the same schema. |

Conveniently, the schema that describes the lookup XML has at least one identity constraint (key or unique), defining the access key(s). The identity constraint may be defined as a part of the schema, or it may be defined under RESTRICTIONS element. If the lookup is defined in-line, then the corresponding schema conveniently has a separate target namespace, and the lookup XML must use this namespace. This is to prevent possible naming conflicts.

The optional FILE element 54 specifies where the lookup information is stored, and how it is to be loaded. TABLE 7 describes the attributes of the FILE element:

TABLE 7

FILE Attributes

| Attribute | Type | Use | Description |
|---|---|---|---|
| url | anyURI | required | Name of the file containing the information. |
| reader | NCName | optional | Name of the CONTENTMASTER processor specified by readerType. |

TABLE 7-continued

FILE Attributes

| Attribute | Type | Use | Description |
|---|---|---|---|
| readerType | parser mapper builder | required | Specifies how the information is to be read: "parser" specifies that a parser should be invoked (name of the parser is specified by the reader attribute) "mapper" specifies that a mapper should be invoked (name of the mapper is specified by the reader attribute) "builder" specifies that the information is read by the MapperBuilder, which creates CONTENTMASTER code that constructs the required XML at runtime |

The optional DB element 55 specifies how the lookup information is stored and accessed. TABLE 8 describes the attributes of the DB element:

TABLE 8

DB Attributes

| Attribute | Type | Use | Description |
|---|---|---|---|
| connectionString | String | Required | Connection string to be used for the informationbase access |
| query | String | required | A SQL string specifying how the information is to be retrieved |

Assuming that the following LOOKUP TABLE is provided: input values black, blue, brown, cyan, gray, green, pink, red, white and yellow should be translated to the corresponding output values: schwarts, blau, braun, turkis, grau, grun, rosa, rot, weiss and gelb. This translation can be defined by a in-line schema and in-line defined information. The scheme is illustrated herein and is followed by the in-line information definition:

```
<SCHEMA name="Lookup">
    <xs:schema targetNamespace="http://www.itemfield.com/Lookup1"
xmlns:xs="http://www.w3.org/2001/XMLSchema"
xmlns:ns1="http://www.itemfield.com/Lookup1" elementFormDefault="qualified"
attributeFormDefault="unqualified">
        <xs:element name="LOOKUP">
            <xs:complexType>
                <xs:sequence>
                    <xs:element name="LOOKUP_ENTRY" maxOccurs="unbounded">
                        <xs:complexType>
                            <xs:attribute name="input"/>
                            <xs:attribute name="output"/>
                        </xs:complexType>
                    </xs:element>
                </xs:sequence>
            </xs:complexType>
```

-continued

```
        <xs:key name="UniqueColor">
            <xs:selector xpath="LOOKUP_ENTRY">
            <xs:field xpath="@input"/>
        </xs:key>
    </xs:element>
  </xs:schema>
</SCHEMA>
```

The in-line definition:

```
<LOOKUPS>
    <LOOKUP name="Colors">
        <ROOT>/LOOKUP</ROOT>
        <clr:LOOKUP>
            <clr:LOOKUP_ENTRY input="black"
            output="schwarz"/>
            <clr:LOOKUP_ENTRY input="blue" output="blau"/>
            <clr:LOOKUP_ENTRY input="brown" output="braun"/>
            <clr:LOOKUP_ENTRY input="cyan" output="turkis"/>
            <clr:LOOKUP_ENTRY input="gray" output="grau"/>
            <clr:LOOKUP_ENTRY input="green" output="grun"/>
            <clr:LOOKUP_ENTRY input="pink" output="rosa"/>
            <clr:LOOKUP_ENTRY input="red" output="rot"/>
            <clr:LOOKUP_ENTRY input="white" output="weiss"/>
            <clr:LOOKUP_ENTRY input="yellow" output="gelb"/>
        </clr:LOOKUP>
    </LOOKUP>
</LOOKUPS>
```

It is noted that the schema contains a "UniqueColor" key definition, and that the schema defines http://www.itemfield.com/Lookup1 target namespace.

The in-line information definition uses an alias clr. It was created using the XMLs attribute in schema root:

```
<WORKSPACE xmlns="http://www.itefield.com/ContentMaster/Mapper"
xmlns:clr="http://www.itemfield.com/Lookup1"
xmlns:xsi="http://www.w3.org/2001/XMLSchema-instance"
xsi:schemaLocation="http://www.itefield.com/ContentMaster/Mapper
C:\DOCUME~1\avri\MYDOCU~1\ItemField\Projects\
IFCMMapperBuilderConsole\IFCMMapperBuilderModel\
InputMapper.xsd" name="Lookup1" sourceType="CM_EXCEL">
```

The following MAP illustrates the used of the LOOKUP( ) function based on these definitions:

```
<MAP>
    <DESTINATION source=
    "A3">/OutputRecords/Record/Field1</DESTINATION>
    <VALUE source="B3">
        <EXPRESSION_DEF>LOOKUP("Colors", "UniqueColor",
                    "/LOOKUP/LOOKUP_ENTRY/@output",
                    VALUEOF("/InputRecords/Record/Field1"))
        </EXPRESSION_DEF>
    </VALUE>
</MAP>
```

FIG. 8 illustrates an exemplary LOOKUP structure, according to an embodiment of the invention.

A parent element GeoInformation 57 is linked to a one or more STATE elements 58 that are linked to one or more CITY elements 59, the two last elements are also referred to as GeoInformation type elements 59'.

Parent element GeoInformation 57 is defined using multiple access keys, segmented key, multiple output values, external files, and external key definitions. It is noted that a LOOKUP( ) function is used in calculations.

The following scheme illustrates a schema that is defined in a separate file:

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:complexType name="GeoUnitType">
        <xs:attribute name="name" type="xs:NCName" use="required"/>
        <xs:attribute name="area" type="xs:decimal" use="required"/>
        <xs:attribute name="population" type="xs:decimal" use="required"/>
    </xs:complexType>
    <xs:element name="GeoInformation">
        <xs:complexType>
            <xs:sequence>
                <xs:element name="STATE" minOccurs="0"
                maxOccurs="unbounded">
                    <xs:complexType>
                        <xs:complexContent>
                            <xs:extension base="GeoUnitType">
                                <xs:sequence>
                                    <xs:element name="CITY" type="GeoUnitType"
minOccurs="0" maxOccurs="unbounded"/>
                                </xs:sequence>
                            </xs:extension>
                        </xs:complexContent>
                    </xs:complexType>
                </xs:element>
            </xs:sequence>
        </xs:complexType>
    </xs:element>
</xs:schema>
```

The sample information is defined in a separate file:

```
<?xml version="1.0" encoding="UTF-8"?>
<GeoInformation xmlns:xsi="http://www.w3.org/2001/XMLSchema-
instance"
xsi:noNamespaceSchemaLocation="C:\Documents and Settings\avri\My
Documents\ItemField\Projects\IFCMMapperBuilderConsole\Tests\
Schemas\Lookup2.xsd">
    <STATE name="Alabama" area="50750" population="4040389">
        <CITY name="Birmingham" area="149.9" population="242820"/>
        <CITY name="Montgomery" area="155.4" population="201568"/>
        <CITY name="Mobile" area="117.9" population="198915"/>
    </STATE>
    <STATE name="Alaska" area="570374" population="550043">
        <CITY name="Anchorage" area"1697.3" population="260283"/>
    </STATE>
    <STATE name="Arizona" area="113642" population="3665339">
        <CITY name="Glendale" area="55.7" population="218812"/>
        <CITY name="Scottsdale" area="184.2" population="202705"/>
    </STATE>
</GeoInformation>
```

FIG. 9 illustrates an exemplary MAPPERS element 70 and its child elements, according to an embodiment of the invention.

MAPPERS element 70 is linked to one or more MAPPER element 72 and each MAPPER element 72 can be linked to ROOTS element, OUTPUTS element 75 and MAPPING GROUPS element 76. Each ROOT element 74 can be linked to one or more ROOT element 77. Each OUTPUTS element 75 can be linked to one or more OUTPUT element 78. A MAPPER element definition corresponds to a mapper definition in the output or to a re-usable mapping definition between complex types and/or complex elements.

TABLE 9 describes the attributes of the MAPPER element:

TABLE 9

MAPPER Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the restriction. |
| name | NCName | required | Provides an identifier to be used in error messages and in construction of the CONTENTMASTER Mapper object. |

The ROOTS element 74 allows to identify the global elements in schemas that are used as roots of the output XMLs. The different roots may not belong to the same schema. Conveniently, the first ROOT element 77 is written to the standard result file. The rest of the ROOT elements 77 should to be written to different output files. The OUTPUTS element 75 is used to define the paths of these files. The correspondence to the roots is positional.

FIG. 10 illustrates a MAPPING_GROUPS element and its child elements, according to an embodiment of the invention.

MAPPING_GROUPS element 76 is linked to one or more MappingGroupsChoice elements that in turn are linked to CONDITIONAL_GROUP element 712, TRANSACTIONAL_GROUP element 714 and ITERATION_GROUP element 716.

Conveniently, the actual children allowed under MAPPING_GROUPS depend on the implementation stage, as illustrated by TABLE 10:

TABLE 10

MAPPING_GROUPS Children

| Stage | Allowed Children | Comment |
|---|---|---|
| 0 | CONDITIONAL_GROUP TRANSACTIONAL_GROUP ITERATION_GROUP | The groups must have one-to-one correspondence to the resulting CONTENTMASTER objects |
| 1, 2 | CONDITIONAL_GROUP TRANSACTIONAL_GROUP | Only one top level TRANSACTIONAL_GROUP is allowed |
| 3 | CONDITIONAL_GROUP TRANSACTIONAL_GROUP ITERATION_GROUP | No limitations on top level |
| 4+ | CONDITIONAL_GROUP TRANSACTIONAL_GROUP ITERATION_GROUP | No limitations on top level |

Figure 11:
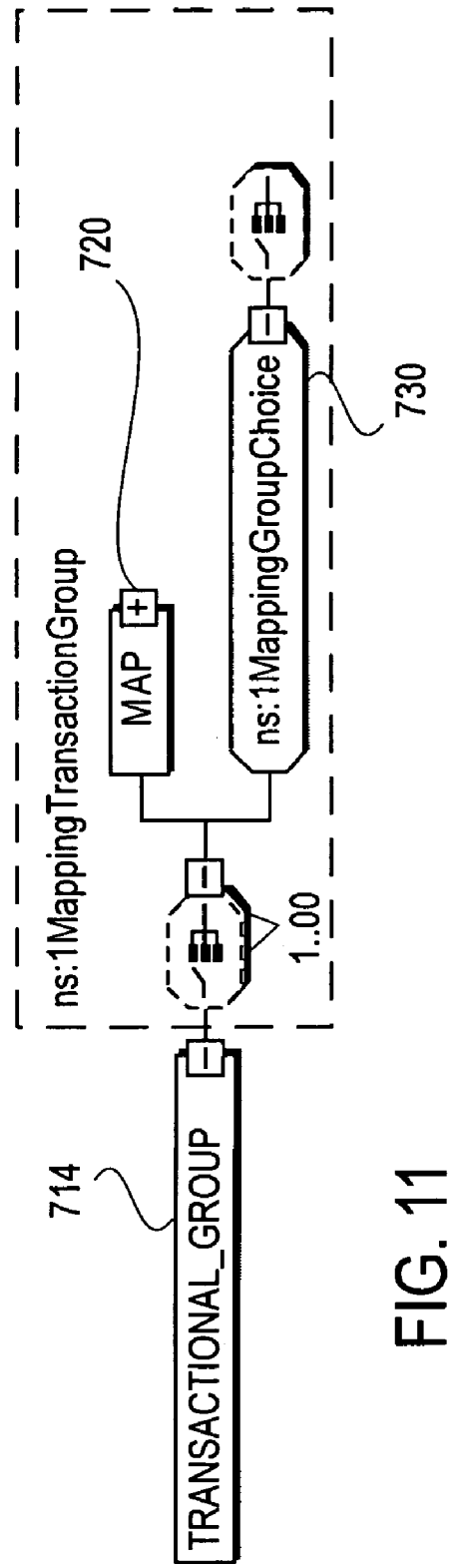
FIG. 11 illustrates a TRANSACTIONAL_GROUP element and its child elements, according to an embodiment of the invention.

FIG. 11 illustrates a TRANSACTIONAL_GROUP element and its child elements, according to an embodiment of the invention. TRANSACTIONAL_GROUP element 714 is linked to one or more MAP elements 720 and to a MappingGroupChoice element 730.

TABLE 11 describes the attributes of the TRANSACTIONAL_GROUP element:

TABLE 11

TRANSACTIONAL_GROUP Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the group. It may be used as a name of the generated CONTENTMASTER object. |
| propagateFailure | boolean | optional | Specifies whether any failure occurring in the group should be propagated to the enclosing entity. The default value is true. In CONTENTMASTER translated into negation of "optional" (i.e. if propagateFailure = "false", the CONTENTMASTER object is optional). |

The semantics of TRANSACTIONAL_GROUP are conveniently equivalent to CONTENTMASTER GroupMapping: Any failure (including false result in condition evaluation) in enclosed groups or maps can stop the execution of the group, and unless marked with propagateFailure="false", the failure may be propagated to the enclosing entity.

Conveniently, implementation the TRANSACTIONAL_GROUP elements are translated directly into CONTENTMASTER. In later stages their content may be shuffled, and additional groups added, based on such criteria as optional inputs and outputs.

Conveniently, in most cases there should be only one TRANSACTIONAL_GROUP directly under MAPPING_GROUPS and enclosing all other maps and groups. The TRANSACTIONAL_GROUP element is used to enclose maps and other groups that constitute a transactional unit—if one fails, all should be rolled back. The value of propagateFailure should be set to "false" in order to allow rollback localization in case of failure. The "source" attribute of TRANSACTIONAL_GROUP should have value if the element has been generated. The "description" attribute of TRANSACTIONAL_GROUP should contain a short description of the group's purpose.

Conveniently, another attribute can be included in this group- an index that allows the map to choose a specific instance of a repeating complex structure in the source schema.

Figure 12:
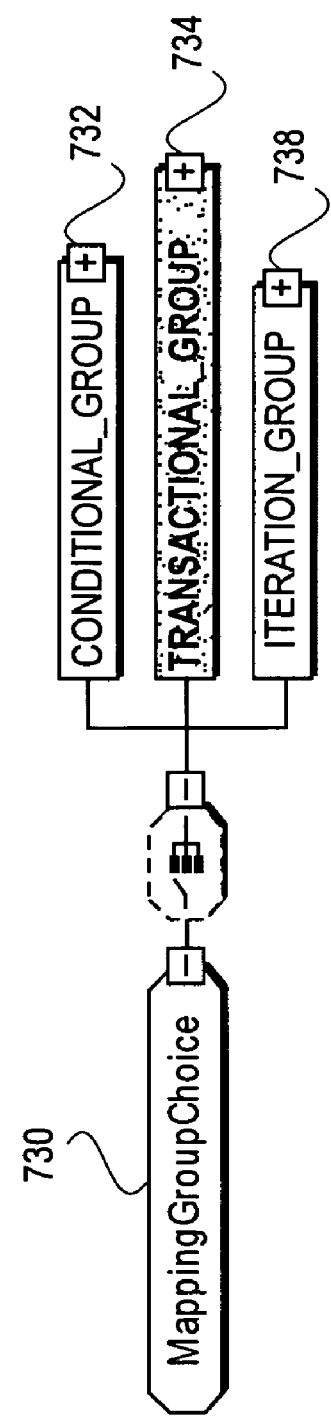
FIG. 12 illustrates a MappingGroupChoice element and its child elements, according to an embodiment of the invention.

FIG. 12 illustrates a MappingGroupChoice element and its child elements, according to an embodiment of the invention.

MappingGroupChoice element 730 is linked to a CONDITIONAL_GROUP element 732, a TRANSACTIONAL_GROUP element 734 and to an ITERATION_GROUP element 738.

Figure 13:
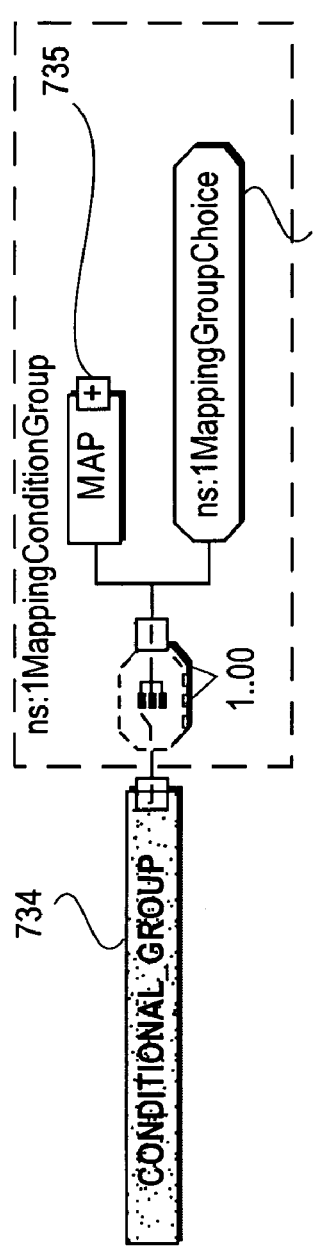
FIG. 13 illustrates a CONDITIONAL_GROUP element and its child elements, according to an embodiment of the invention.

FIG. 13 illustrates a CONDITIONAL_GROUP element and its child elements, according to an embodiment of the invention.

CONDITIONAL_GROUP element 734 is linked to a MAP element 735 and to a MappingGroupChoice element 736.

TABLE 12 describes the attributes of the CONDITIONAL_GROUP element:

TABLE 12

CONDITIONAL_GROUP Attributes

| Attribute | Type | Use | Description |
| --- | --- | --- | --- |
| Id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the group. It may be used as a name of the generated CONTENTMASTER object. |
| propagateFailure | boolean | optional | Specifies whether any failure occurring in the group should be propagated to the enclosing entity. The default value is true. In CONTENTMASTER translated into negation of "optional" (i.e. if propagateFailure = "false", the CONTENTMASTER object is optional). |

Conveniently, the semantics of CONDITIONAL_GROUP are equivalent to CONTENTMASTER AlternativeMappings: If any enclosed map or group fails, the next one is executed, If an enclosed map or group does not fail, the rest of the maps/groups are not executed. Conveniently, when combined with conditions on maps, these semantics provide an if-then-elseif-else construct.

Conveniently, implementation the CONDITIONAL_GROUP elements are translated directly into CONTENTMASTER AlternativeMappings. In later stages their content may be shuffled, and additional groups added, based on such criteria as optional inputs and outputs.

Conveniently, CONDITIONAL_GROUP can be used in order to implement if-then-else if-else logic. Conveniently, propagateFailure should be set to "false" in order to perform rollback localization in case of failure. Conveniently a "catch-all" group should be included as a last clause of CONDITIONAL_GROUP. The "source" attribute of CONDITIONAL_GROUP should have value if the element has been generated. The "description" attribute of CONDITIONAL_GROUP should contain a short description of the group's purpose.

Figure 14:
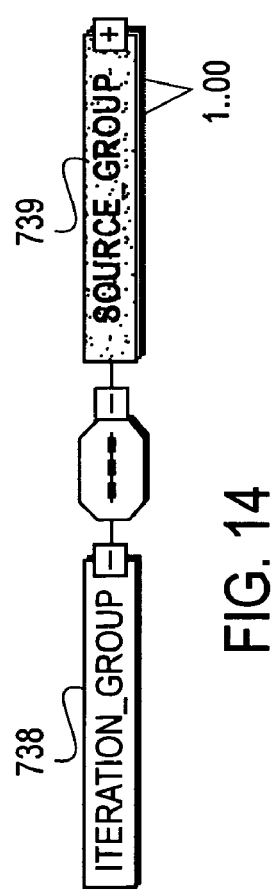
FIG. 14 illustrates an ITERATION_GROUP element and its child elements, according to an embodiment of the invention.

FIG. 14 illustrates an ITERATION_GROUP element and its child elements, according to an embodiment of the invention.

ITERATION_GROUP element 738 IS LINKED TO ONE OR MORE SOURCE GROUP element 739.

Figure 15:
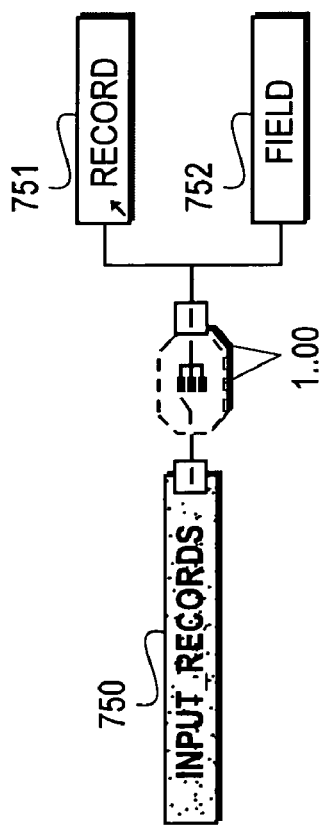
FIG. 15 illustrates an INPUT_RECORDS element and its child elements, according to an embodiment of the invention.

The ITERATION_GROUP represents iteration on multiple inputs. Actions performed on each input are enclosed into a separate SOURCE_GROUP. FIG. 15 illustrates a case where multiple SOURCE_GROUP elements are required. When iterating on children of INPUT_RECORDS, the result can be a RECORD or FIELD elements. Conveniently, actions taken on RECORD are grouped into a separate SOURCE_GROUP from the actions taken on FIELD.

The following mXML defined an INERATION GROUP element with multiple SOURCE GROUP elements:

```
<ITERATION_GROUP>
    <SOURCE_GROUP description="Processing RECORD">
        <!-- Maps and groups processing RECORD-->
        <SOURCE_PATH>/INPUT_RECORD/RECORD
        </SOURCE_PATH>
    </SOURCE_GROUP>
    <SOURCE_GROUP description="Processing FIELD">
        <!-- Maps and groups processing FIELD-->
        <SOURCE_PATH>/INPUT_RECORD/FIELD</SOURCE_PATH>
    </SOURCE_GROUP>
</ITERATION_GROUP>
```

TABLE 13 describes the attributes of the SOURCE_PATH element:

TABLE 23

SOURCE_PATH Attributes

| Attribute | Type | Use | Description |
| --- | --- | --- | --- |
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the SOURCE_PATH. |
| schema | NCName | optional | Specifies the name of the schema the path belongs to. Should be used to resolve ambiguities between schemas with similar paths, as may occur in mapping between different versions of the same schema. |

TABLE 14 describes the attributes of the SOURCE_GROUP element:

TABLE 34

SOURCE_GROUP Attributes

| Attribute | Type | Use | Description |
| --- | --- | --- | --- |
| id | string | optional | GUID identifying the element. For use in future features such as back propagation. |

TABLE 34-continued

SOURCE_GROUP Attributes

| Attribute | Type | Use | Description |
|---|---|---|---|
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the group. It may be used as a name of the generated CONTENTMASTER object. |
| propagateFailure | boolean | optional | Specifies whether any failure occurring in the group should be propagated to the enclosing entity. The default value is true. In CONTENTMASTER translated into negation of "optional" (i.e. if propagateFailure = "false", the CONTENTMASTER object is optional). |

Conveniently, when an ITERATION_GROUP contains only one SOURCE_GROUP, it is translated into a RepeatingGroupMapping object directly containing the translation of the SOURCE_GROUP content. Conveniently, when an ITERATION_GROUP contains more than one SOURCE_GROUP elements, the resulting RepeatingGroupMapping object will contain AlternativeMappings, with a separate GroupMapping for each source.

Conveniently, propagateFailure is set to "false" in order to support rollback localization in case of failure. Conveniently the "source" attribute of SOURCE_GROUP should have value if the element has been generated. Conveniently, the "description" attribute of SOURCE_GROUP should contain a short description of the group's purpose.

FIG. 15 illustrates an INPUT_RECORDS element 750 and its child elements, according to an embodiment of the invention. INPUT_RECORDS element 750 is linked to RECORD element 751 and to FIELD element 752.

Figure 16:
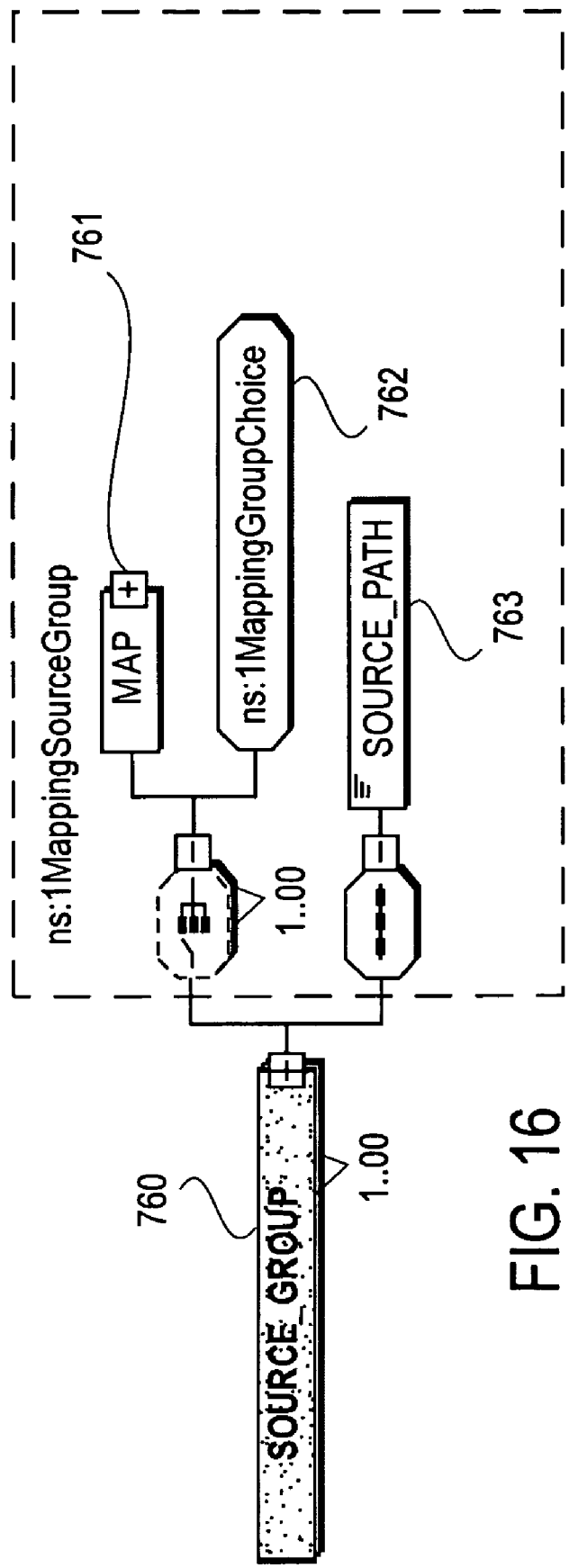
FIG. 16 illustrates an SOURCE_GROUP element and its child elements, according to an embodiment of the invention.

FIG. 16 illustrates an SOURCE_GROUP element 760 and its child elements, according to an embodiment of the invention. SOURCE_GROUP element 760 is linked to MAP element 761, to SOURCE_PATH element 763 and to MappingGroupChoice ELEMENT 762.

Figure 17:
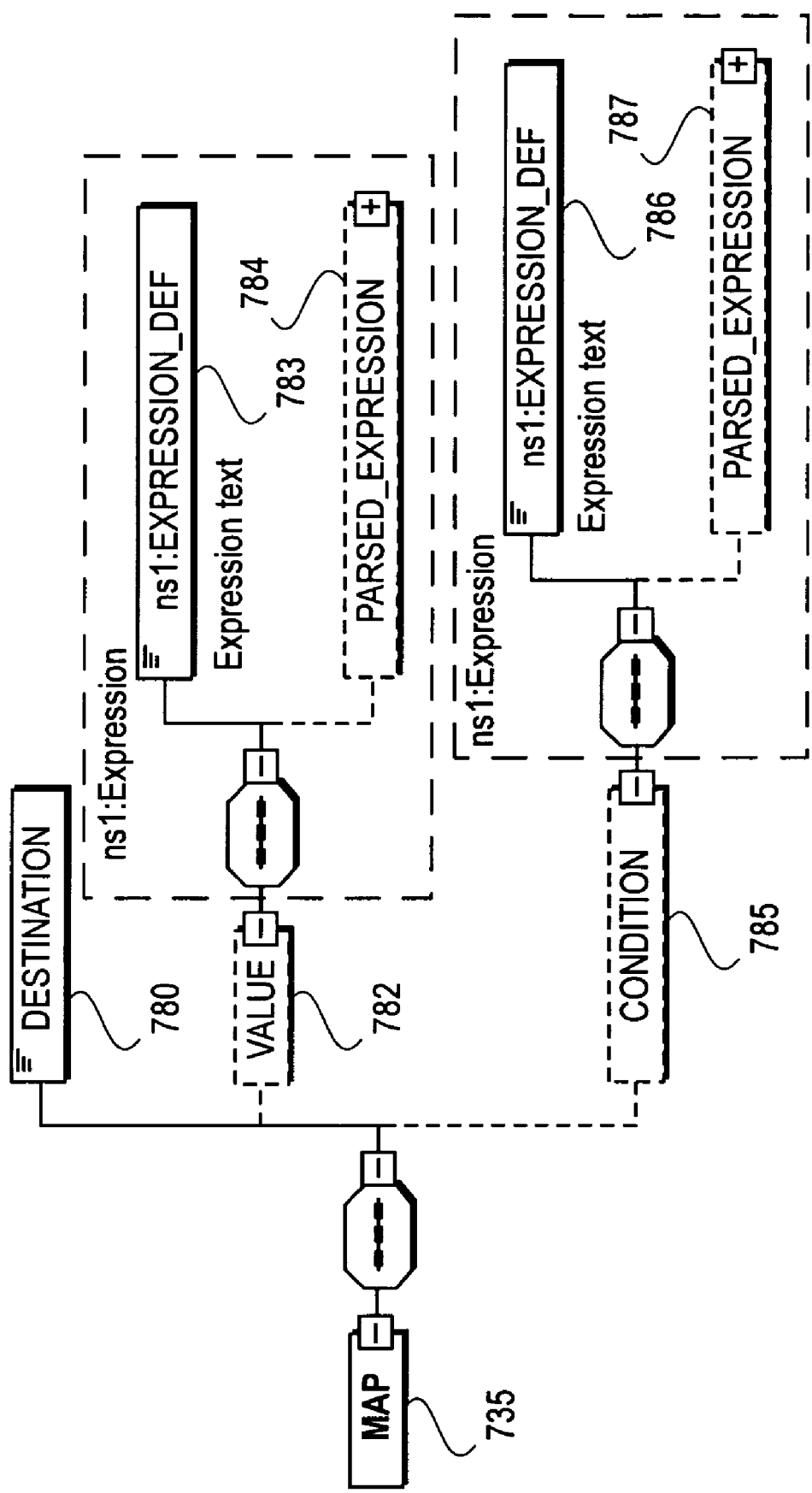
FIG. 17 illustrates a MAP element and its child elements, according to an embodiment of the invention.

FIG. 17 illustrates a MAP 735 element and its child elements, according to an embodiment of the invention. MAP element 735 is linked to DESTINATION element 780, to VALUE element 782 and to CONDITION element 785. The VALUE element 782 is linked to EXPRESSION_DEF element 783 and to PARSED_EXPRESSION element 784. The CONDITION element 785 is linked to EXPRESSION_DEF element 786 and to PARSED_EXPRESSION element 786.

The MAP element 735 represents a creation of an output node and optionally value assignment.

TABLE 15 describes the attributes of the MAP element:

TABLE 45

MAP Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the map. It may be used as a name of the generated CONTENTMASTER object. |
| allowOverwrite | boolean | optional | The default is false. The attribute specifies whether to signal an error when there is an attempt to overwrite a value of an existing element/attribute. |

The DESTINATION element specifies the full XPath of the node to be created. TABLE 16 describes the attributes of the DESTINATION element:

TABLE 56

DESTINATION Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the destination. It may be used as a name of the generated CONTENTMASTER object. |
| schema | NCName | optional | Specifies the name of the schema the path belongs to. Should be used to resolve ambiguities between schemas with similar paths, as may occur in mapping between different versions of the same schema. |

Conveniently, the mXML should contain a MAP element for each node created in output, including root. The order of MAP elements is important—creation of a parent should precede the creation of child. The "source" attribute of DESTINATION should have value if the element has been generated.

The optional VALUE element specifies the value to be assigned to the created node. In mXML this should be an expression that is specified using EXPRESSION_DEF element.

The VALUE expression may be a constant or a function invocation. A special case is invocation of VALUEOF( ) function with XPath specifying an input complex element without value. In such case the output node is created, but no value is assigned.

TABLE 17 describes the attributes of the VALUE element:

TABLE 67

VALUE Attributes

| Attribute | Type | Use | Description |
|---|---|---|---|
| id | string | optional | GUID identifying the element. For use in future features such as back propagation. |
| source | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the destination. It may be used as a name of the generated CONTENTMASTER object. |

If VALUE expression is a constant, the output node is created with that value—without dependence on any input. If VALUE is not specified, the output node is created with no value—without dependence on any input. Conveniently, VALUE should include either VALUEOF( )or CALCULATE_VALUE( ) invocation. The "source" attribute of VALUE should have value if the element has been generated.

The optional CONDITION element specifies the condition for the creation of an output node. In mXML this should be a boolean MSEL expression (see "ContentMaster Proposed Expression Language for Mapping Specifications (MSEL)"), specified using EXPRESSION_DEF element.

Table 18 describes the attributes of the CONDITION element:

TABLE 78

CONDITION Attributes

| Attribute | Type | Use | Description |
|---|---|---|---|
| id | string | optional | GUID identifying the element. For use in future features such as back propagation. |
| SOURCE | string | optional | A string that allows connecting this element with its origin in user input. For example, if mXML is created from an Excel workbook, then the source should contain the name of the worksheet and the range supplying the information for this element. If specified, the source string appears in all error messages relating to this element. |
| description | string | optional | Provides user-specific description of the destination. It may be used as a name of the generated CONTENTMASTER object. |

Conveniently, conditions control output node creation only. If the node value is created using some conditional logic, that logic should be implemented in the VALUE expression. For example, if input value is less than or equal 100, the output value should be "SMALL", and if input value is greater than 100, the output value should be "LARGE".

An exemplary code that uses the VALUE element can have the following form:

```
<CONDITIONAL_GROUP>
    <MAP>
        <DESTINATION>/OUTPUT/RECORD</DESTINATION>
        <VALUE>
            <EXPRESSION_DEF>
                IF(VALUEOF("/INPUT/RECORD")<=100,
                "SMALL", "LARGE")
            </EXPRESSION_DEF>
        </VALUE>
    </MAP>
</CONDITIONAL_GROUP>
```

Figure 18:
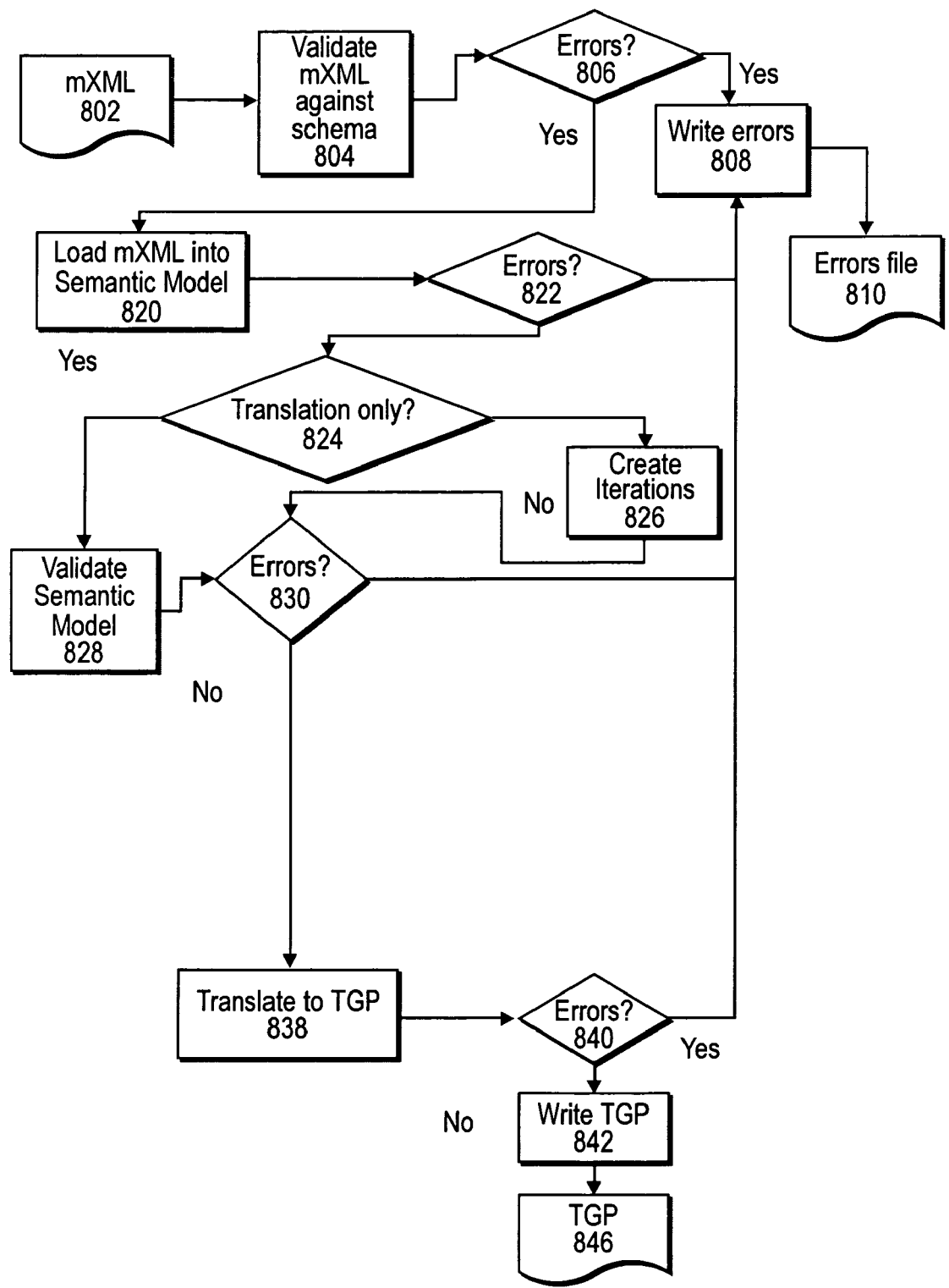
FIG. 18 illustrates a information transformation code generation method, according to an embodiment of the invention.

Conveniently, CONDITION should contain ENSURE_CONDITION( ) invocation. CONDITION may be used in any group, and not only CONDITIONAL_GROUP. The "source" attribute of CONDITION should have value if the element has been generated FIG. 18 illustrates a information transformation code generation method 800, according to an embodiment of the invention.

Method 800 starts by stage 802 of receiving a mXML specification and, validating the specification (stage 804), and checking if the specification is legal (note query stage 806 "error"). If it is not legal stage 806 is followed by stage 808 of writing error messages (stage 808) to an error file (810).

Else, (if the specification is valid) stage 808 is followed by stage 820 of loading the mXML into a semantic model and query stage 822 of checking if the mXML specification can be loaded into an internal object model. If the answer is negative stage 822 is followed by stage 808, else it is followed by query stage 824 of determining whether to validate the semantic model (box 828) or to create iterations (box 826). The iterations involve using "heuristics" that help fill in a gap between what the user specifies and what he wants (for example by using hints from the source or target schema to fill gaps in the mapping).

Stages 828 and 826 are followed by stage 830 of determining if the internal object model includes enough information in order to proceed. If the answer is negative stage 830 is followed by stage 808, else it is followed by stage 838 of translating to CONTENTMASTER. Stage 838 is followed by stage 840 of checking errors. If there are no errors stage 840 is followed by stage 842 of providing CONTENTMASTER code. Else, stage 840 is followed by stage 808.

Figure 19:
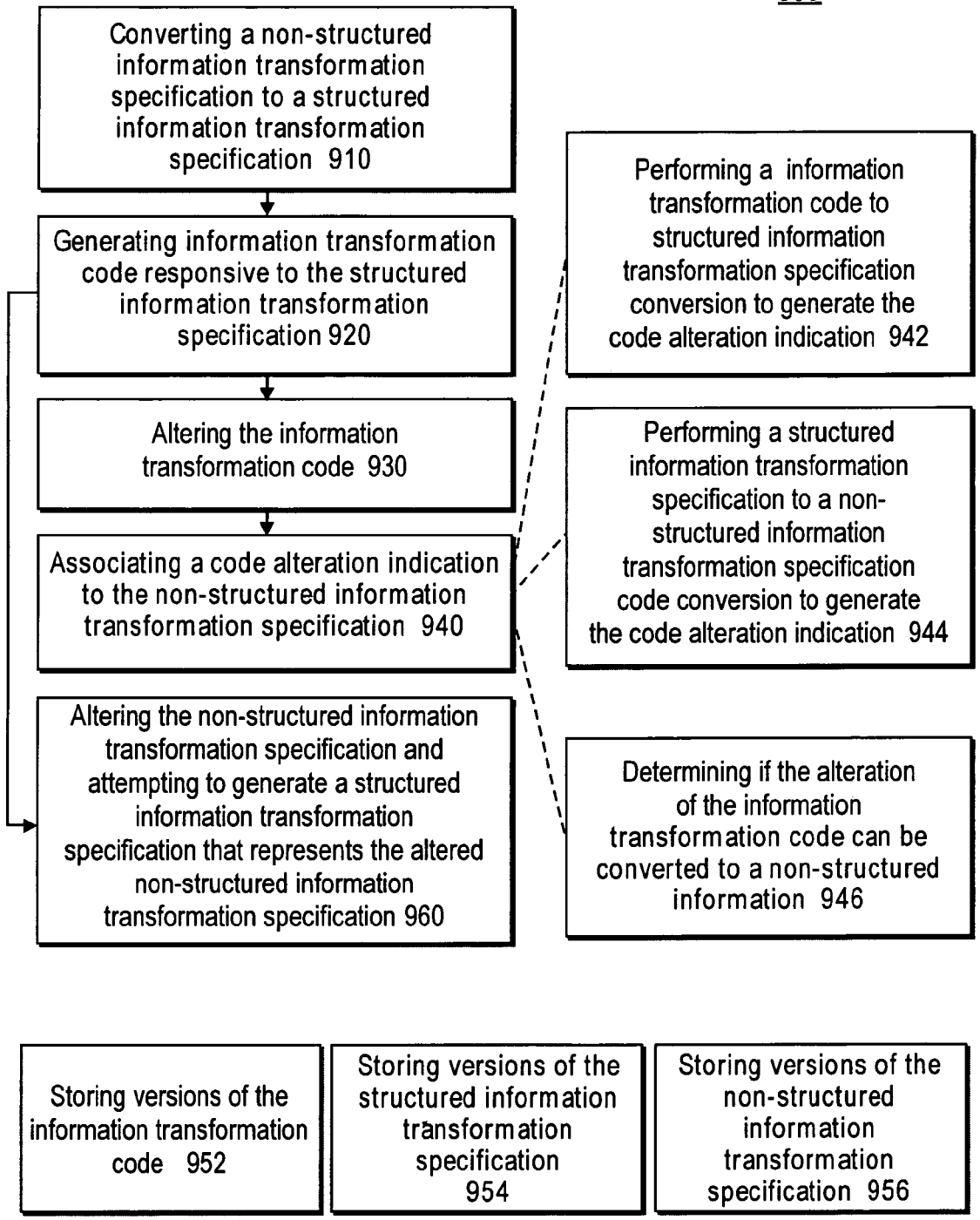
FIG. 19 is a flow chart of a method for converting information, according to an embodiment of the invention.

FIG. 19 is a flow chart of a method 900 for converting information, according to an embodiment of the invention and FIG. 20 illustrates an exemplary implementation of method 900, according to an embodiment of the invention.

Method 900 starts by stage 910 of converting a non-structured information transformation specification to a structured information transformation specification. Referring to FIG. 20, a non-structured information transformation specification such as a spreadsheet type specification 1010 is converted to a structured information transformation specification such as mXML. This is illustrates by box 1010 that is connected via arrow sXML (a simple one-to-one XML representation of the data in the spreadsheet) to box 1020 denoted "mapping via Content Master". The latter is a tool that converts sXML to mXML. Conveniently, the constructs in mXML are linked back to the spreadsheet rows that generated them.

Stage 910 is followed by stage 920 of generating information transformation code responsive to the structured information transformation specification. Referring to FIG. 20, box 1030 (denoted "Translation (mXML to ContentMaster)

is connected by arrow mXML to box 1040 provide a code such as ContentMaster format code. Conveniently, the ContentMaster constructs are linked back to the mXML which generated them.

Stage 920 is followed by stage 930 of altering the information transformation code. Referring to FIG. 20, and assuming that the code can be altered by using a man machine interface tool known as ContentMaster Studio (see box 1040), the ContentMaster code can be altered.

Stage 930 is followed by stage 940 of associating a code alteration indication to the non-structured information transformation specification.

Referring to FIG. 20, this may include boxes 1050, 1060, 1080 and 1090. If, for example the alteration is valid and can be transferred to the spreadsheet format (these conditions can be checked by box 1070 than represents the ContentMaster engine that performs code verification, compilations and the like) and the sequence continues to box 1050 (denoted "reverse translation (ContentMaster to mXML)") of performing a reverse translation from the information transformation code to a structured information transformation specification. Box 1050 is followed by box 1060 of converting the XML specification to a spreadsheet type specification. This conversion provides an altered non-structured information transformation specification that represents the information transformation code alteration. The alterations can be marked in various manners.

If, for example the alteration is not-valid and/or can not be transferred to the spreadsheet format then the sequence follows to generating an error indication, translating the error to a structured information transformation specification error format (box 1080) and providing error indications to the user of the spreadsheet 1010.

Conveniently, stage 940 includes stage 942 of performing a information transformation code to structured information transformation specification conversion to generate the code alteration indication. Referring to FIG. 20, this is represented by stages 1050-1090.

Conveniently, stage 940 includes stage 944 of performing a structured information transformation specification to a non-structured information transformation specification code conversion to generate the code alteration indication.

Conveniently, stage 940 includes stage 946 of determining if the alteration of the information transformation code can be converted to a non-structured information specification conversion format. Referring to FIG. 20, this is represented by box 1070.

Conveniently, the code alteration indication affects the non-structured information transformation specification.

Conveniently, the non-structured information transformation specification is a spreadsheet format information transformation specification.

Conveniently, method 900 includes stage 952 of storing versions of the information transformation code. Stage 946 can include determining an alteration by comparing between at least two versions of the information transformation code.

Conveniently, method 900 includes stage 954 of storing versions of the structured information transformation specification. Stage 946 can include determining an alteration by comparing between at least two versions of the structured information transformation specification.

Conveniently, method 900 includes stage 956 of storing versions of the non-structured information transformation specification. Stage 946 can include determining an alteration by comparing between at least two versions of the non-structured information transformation specification.

Conveniently, method 900 includes stage 960 of altering the non-structured information transformation specification and attempting to generate a structured information transformation specification that represents the altered non-structured information transformation specification.

Referring back to FIG. 20, box 1020 includes translating a spreadsheet to mXML schema by ContentMaster. Conveniently, The constructs in mXML schema are linked back to the spreadsheet rows that generated them. The mXML schema is transformed to code by a compiler such as a MapperBuilder. The code constructs are linked back to the mXML which generated them.

It is assumed that an analyst alters the spreadsheet and a programmer alters the code then. When the programmer changes the code the new resulting code is compared to the previous code. Changes are translated back into mXML and can show up to the analyst as a modification to spreadsheet. Conveniently, the programmer can to modify the spreadsheet directly using tools such as but not limited to the ContentMaster studio development environment.

Conveniently, if the code alterations cannot be translated back to mXML schema they can be added to an override object linked to the related mXML schema. The affected mXML construct is marked so that the analyst will know that there is new semantics attached to the relevant portion of the specification.

Conveniently, if the analyst changes the spreadsheet the programmer modified parts of the executable not affected by those changes will not changed. This relationship between the analyst changes and previously altered code can be determined by comparing new versions and prior versions on both before and after versions of the mXML schemas and the ContentMaster code. If the changes become too difficult to track, the effected part of the specification can be marked for the analyst, and any changes to that portion of the specification will be marked for the requires the intervention of a programmer.

Conveniently, every object in the override set is actually a new template describing how to create a more specific mapping model (appropriate for this specific customer) from the generic mXML schema.

Conveniently, if there is a runtime (or other error) the error is linked to the appropriate construct in the ContentMaster code, which is translated to the appropriate construct in the mXML intermediate model, it can be displayed to the analyst by translating the mXML construct back to the spreadsheet construct which defined it.

The following example will further illustrates the translation from code alteration to specification alteration. It is assumed that an analyst creates the specifications of the transformations needed for two applications to interchange real-time data. Method 900 or at least some of its stages convert the specification to code. The analyst can be responsible to this transformation. It is further assumed that a scripter can augment the executable script created by the analyst if needed. Usually the scripter (or programmer) handles the "hard" problems or extreme cases. The scripter needs to make sure that any changes do not conflict with the correctness as defined by the analyst.

Methods 900 and 1000 try to ensure that the specification created by analyst and the script reflect each other. The Analysts needs to be able to vet the changes made to a specification's implementation by the Scripter.

It is further assumed that that there is a "Script Generator" (or some equivalent stages of either one of methods 900 or 1000) that can take a specification and create an equivalent script. There also exists a "Specification Generator" (or some equivalent stages of either one of methods 900 or 1000) that can take a script and in most case generate a specification. If the "specification generator" cannot create an equivalent spec—then there is a mechanism (such as via a remark) that can be used to notify the analyst of the information missing from the formal part of the specification. If the script created is relevant to a specific part of the specification created by the analyst—that part of the spec is made "read only" so that the analyst understands that changing that part of the spec requires the intervention of a scripter. The goal is to keep such "dead specs" to a minimum.

For a mapping specification created in Excel it is assumed that for the most part there is no meaning to the order of the rows unless specifically required by the analyst.

The first example assumes that the analyst modified the specification (for example Excel specification) and that the script was correct before this modification.

The alteration is followed by a stage of using the script generator to create $SCRIPT_{1Normalized}$ from the specification (referred to as SPEC). $SCRIPT_{1Normalized}$ also includes the appropriate back references from the SPEC that caused the script objects to be generated.

The next stage includes using the specification generator on $SCRIPT_{1Normalized}$ to create $SPEC_{1Normalized}$. $SPEC_{1Normalized}$ includes the appropriate back references to $SCRIPT_{1Normalized}$ objects that generated the $SPEC_{1Normalized}$ objects.

Then, the specification generator generates $SPEC_{2Normalized}$ from SCRIPT with the appropriate back references to the SCRIPT objects which generated the $SPEC_{2Normalized}$ objects.

The following stage includes useing the script generator to generate $SCRIPT_{2Normalized}$ from $SPEC_{2Normalized}$ (again with the appropriate back references to the $SCRIPT2Normalized$ objects which generated the $SPEC_{2Normalized}$ objects). It is noted that $SCRIPT_{2Normalized}$ is used for as a control, comparison and filtering.

The next stage includes finding the most closely related rows in $SPEC_{1Normalize}$ and $SPEC_{2Normalized}$. This stage is followed by linking $SCRIPT_{1Normalized}$ objects to their related SCRIPT objects—this is based on the simple linkages of the basic relationships between simple script objects and heuristics that take into account how the script is used to group objects. This gives the basis to understand the changes in specification and how they should effect the script.

Accordingly- there are 3 main entities that used to synchronize the changes: (i) $SCRIPT_{1Normalized}$—the source for user changes, (ii) $SCRIPT_{2Normalized}$—the basis for filtering and finding changes that need to propagated, and (iii) SCRIPT—the target for the changes. The changes are merged into SCRIPT in order to provide the new modified script.

It is noted that if $SCRIPT_{1Normalized}$ object property equals $SCRIPT_{2Normalized}$ object property then there is no change to SCRIPT. If $SCRIPT_{1Normalized}$ object property equals $SCRIPT_{2Normalized}$ object property then the SCRIPT should be updated with the change. If $SCRIPT_{1Normalized}$ object property doesn't exist as an $SCRIPT_{2Normalized}$ object property in then the SCRIPT should be updated with the new script object. If $SCRIPT_{2Normalized}$ object property doesn't exist in $SCRIPT_{1Normalized}$ as an object property then the object should be deleted from SCRIPT.

Figure 21:
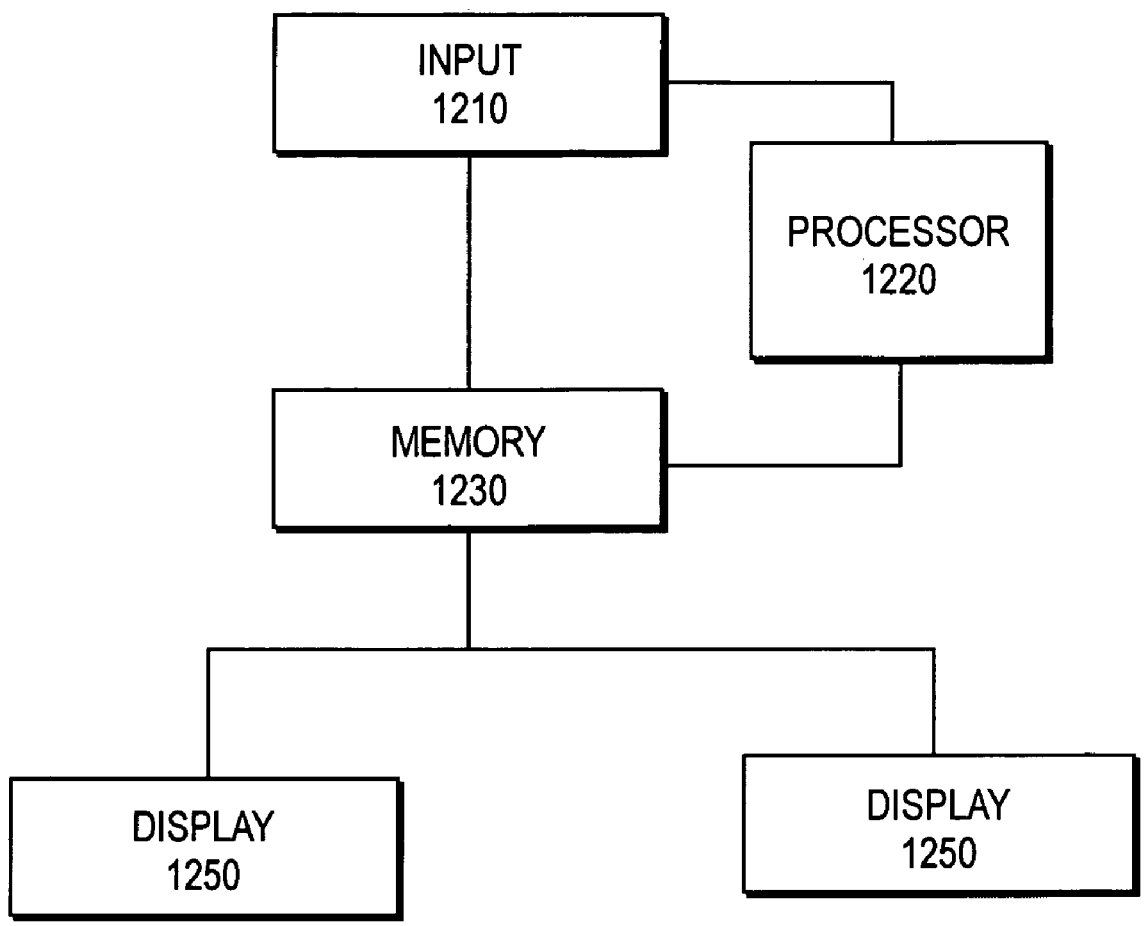
FIG. 21 illustrates an information converter, according to en embodiment of the invention.

FIG. 21 illustrates an information converter 1200, according to en embodiment of the invention.

Information converter 1200 includes an input 1210 for receiving non-structured information transformation specification, and a processor 1220. The processor 1220 is adapted to: (i) convert the non-structured information transformation specification to a structured information transformation specification; (ii) generate information transformation code responsive to the structured information transformation specification; altering the information transformation code; and (iii) associate a code alteration indication to the non-structured information transformation specification.

It is noted that information converter 1200 can include memory units, such as memory 1230, for storing the various structured information transformation specifications and/or non-structured information transformation specifications, information transformation code, information transformation generating code.

Information converter 1200 also include one or more displays 1250 in order to display to the analyzer and programmer various information, and to allow alterations of the information transformation code, non-structured information transformation code and the like.

Information converter 1200 can have a distributed architecture, a centralized architecture and the like. It usually include various software components, hardware components and the like. It may include (or be adapted to read or otherwise access) a computer readable medium that includes code that when executed by the processor 1220 causes the information converter 1220 to: (i) converting the non-structured information transformation specification to a structured information transformation specification; (ii) generate information transformation code responsive to the structured information transformation specification; altering the information transformation code; and (iii) associate a code alteration indication to the non-structured information transformation specification.

The present invention can be practiced by employing conventional tools, methodology and components. Accordingly, the details of such tools, component and methodology are not set forth herein in detail. In the previous descriptions, numerous specific details (such as a certain compression standard) are set forth in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

ADDITIONAL EXAMPLES ILLUSTRATED IN COMPUTER CODE

An exemplary mXML is illustrated below:

```xml
<?xml version="1.0" encoding="UTF-8"?>
<xs:schema targetNamespace="http://www.itefield.com/ContentMaster/Mapper"
xmlns:xs="http://www.w3.org/2001/XMLSchema"
xmlns:ns1="http://www.itefield.com/ContentMaster/Mapper"
elementFormDefault="qualified" attributeFormDefault="unqualified">
    <!--xs:import namespace="http://www.w3.org/2001/XMLSchema"
schemaLocation="http://www.w3.org/2001/XMLSchema.xsd"/-->
    <xs:import namespace="http://www.w3.org/2001/XMLSchema"
schemaLocation="XMLSchema.xsd"/>
    <xs:simpleType name="WorkspaceType">
        <xs:restriction base="xs:string">
            <xs:enumeration value="CM_EXCEL"/>
        </xs:restriction>
    </xs:simpleType>
    <xs:simpleType name="InformationType">
        <xs:annotation>
            <xs:documentation>One of the XSD simple information types or "Nothing"</xs:documentation>
        </xs:annotation>
        <xs:restriction base="xs:QName"/>
    </XS:SIMPLETYPE>
```

```xml
<xs:simpleType name="RestrictionOperation">
    <xs:restriction base="xs:string">
        <xs:enumeration value="add"/>
        <xs:enumeration value="delete"/>
        <xs:enumeration value="replace"/>
    </xs:restriction>
</xs:simpleType>
<xs:simpleType name="OverrideType">
    <xs:restriction base="xs:string">
        <xs:enumeration value="add"/>
        <xs:enumeration value="delete"/>
        <xs:enumeration value="replace"/>
    </xs:restriction>
</xs:simpleType>
<xs:simpleType name="ReaderType">
    <xs:restriction base="xs:string">
        <xs:enumeration value="parser"/>
        <xs:enumeration value="mapper"/>
        <xs:enumeration value="builder"/>
    </xs:restriction>
</xs:simpleType>
<xs:complexType name="XPath">
    <xs:simpleContent>
        <xs:extension base="xs:string">
            <xs:attribute name="id" type="xs:string" use="optional">
                <xs:annotation>
                    <xs:documentation>Assigned by mapper semantics</xs:documentation>
                </xs:annotation>
            </xs:attribute>
            <xs:attribute name="source" type="xs:string" use="optional">
                <xs:annotation>
                    <xs:documentation>Should be provided for each element derived from the source document</xs:documentation>
                </xs:annotation>
```

```
        </xs:attribute>
        <xs:attribute name="description" type="xs:string" use="optional"/>
        <xs:attribute name="schema" type="xs:NCName" use="optional"/>
      </xs:extension>
    </xs:simpleContent>
  </xs:complexType>
  <xs:complexType name="Base">
    <xs:annotation>
      <xs:documentation>Base type for elements with id, source and description</xs:documentation>
    </xs:annotation>
    <xs:attribute name="id" type="xs:string" use="optional">
      <xs:annotation>
        <xs:documentation>Assigned by mapper semantics</xs:documentation>
      </xs:annotation>
    </xs:attribute>
    <xs:attribute name="source" type="xs:string" use="optional">
      <xs:annotation>
        <xs:documentation>Should be provided for each element derived from the source document</xs:documentation>
      </xs:annotation>
    </xs:attribute>
    <xs:attribute name="description" type="xs:string" use="optional"/>
  </xs:complexType>
  <xs:complexType name="NamedBase">
    <xs:annotation>
      <xs:documentation>Base with name attribute</xs:documentation>
    </xs:annotation>
    <xs:complexContent>
      <xs:extension base="ns1:Base">
        <xs:attribute name="name" type="xs:NCName" use="required"/>
      </xs:extension>
    </xs:complexContent>
  </xs:complexType>
```

```xml
<xs:complexType name="ParsedExpression">
    <xs:annotation>
        <xs:documentation>Parsed expression</xs:documentation>
    </xs:annotation>
    <xs:choice>
        <xs:element name="FUNC_CALL">
            <xs:complexType>
                <xs:sequence>
                    <xs:element name="VALUE" type="ns1:ParsedExpression" minOccurs="0" maxOccurs="unbounded"/>
                </xs:sequence>
                <xs:attribute name="head" type="xs:NCName" use="required">
                    <xs:annotation>
                        <xs:documentation>Name of the function</xs:documentation>
                    </xs:annotation>
                </xs:attribute>
            </xs:complexType>
        </xs:element>
        <xs:element name="ATOM">
            <xs:complexType>
                <xs:attribute name="type" type="ns1:InformationType" use="required"/>
                <xs:attribute name="value" type="xs:anySimpleType" use="optional">
                    <xs:annotation>
                        <xs:documentation>If not specified, type="Nothing"</xs:documentation>
                    </xs:annotation>
                </xs:attribute>
            </xs:complexType>
        </xs:element>
    </xs:choice>
</xs:complexType>
<xs:complexType name="Expression">
    <xs:annotation>
        <xs:documentation>Either expression text or parsed expression</xs:documentation>
    </xs:annotation>
```

```
            <xs:complexContent>
                <xs:extension base="ns1:Base">
                    <xs:sequence>
                        <xs:element ref="ns1:EXPRESSION_DEF"/>
                        <xs:element name="PARSED_EXPRESSION" type="ns1:ParsedExpression"
minOccurs="0"/>
                    </xs:sequence>
                </xs:extension>
            </xs:complexContent>
        </xs:complexType>
        <xs:complexType name="MappingGroup" abstract="true">
            <xs:complexContent>
                <xs:extension base="ns1:Base">
                    <xs:choice maxOccurs="unbounded">
                        <xs:element name="MAP">
                            <xs:complexType>
                                <xs:complexContent>
                                    <xs:extension base="ns1:Base">
                                        <xs:sequence>
                                            <xs:element name="DESTINATION" type="ns1:XPath"/>
                                            <xs:element name="VALUE" type="ns1:Expression"
minOccurs="0"/>
                                            <xs:element name="CONDITION" type="ns1:Expression"
minOccurs="0"/>
                                        </xs:sequence>
                                        <xs:attribute name="allowOverwrite" type="xs:boolean"
use="optional"/>
                                    </xs:extension>
                                </xs:complexContent>
                            </xs:complexType>
                        </xs:element>
                        <xs:group ref="ns1:MappingGroupChoice"/>
                    </xs:choice>
```

```xml
            <xs:attribute name="propagateFailure" type="xs:boolean" use="optional" default="true"/>
         </xs:extension>
      </xs:complexContent>
   </xs:complexType>
   <xs:complexType name="MappingConditionGroup">
      <xs:complexContent>
         <xs:extension base="ns1:MappingGroup"/>
      </xs:complexContent>
   </xs:complexType>
   <xs:complexType name="MappingTransactionGroup">
      <xs:complexContent>
         <xs:extension base="ns1:MappingGroup"/>
      </xs:complexContent>
   </xs:complexType>
   <xs:complexType name="MappingSourceGroup">
      <xs:complexContent>
         <xs:extension base="ns1:MappingGroup">
            <xs:sequence>
               <xs:element name="SOURCE_PATH" type="ns1:XPath"/>
            </xs:sequence>
         </xs:extension>
      </xs:complexContent>
   </xs:complexType>
   <xs:group name="MappingGroupChoice">
      <xs:choice>
         <xs:element name="CONDITIONAL_GROUP" type="ns1:MappingConditionGroup"/>
         <xs:element name="TRANSACTIONAL_GROUP" type="ns1:MappingTransactionGroup"/>
         <xs:element name="ITERATION_GROUP">
            <xs:complexType>
               <xs:sequence>
```

```xml
                <xs:element name="SOURCE_GROUP" type="ns1:MappingSourceGroup" maxOccurs="unbounded"/>
            </xs:sequence>
        </xs:complexType>
    </xs:element>
  </xs:choice>
</xs:group>
<xs:element name="FUNCTION_DEF" type="xs:string">
    <xs:annotation>
        <xs:documentation>Text of function definition</xs:documentation>
    </xs:annotation>
</xs:element>
<xs:element name="EXPRESSION_DEF" type="xs:string">
    <xs:annotation>
        <xs:documentation>Expression text</xs:documentation>
    </xs:annotation>
</xs:element>
<xs:element name="WORKSPACE">
    <xs:annotation>
        <xs:documentation>Root element of mapping specification</xs:documentation>
    </xs:annotation>
    <xs:complexType>
        <xs:sequence>
            <xs:element name="SCHEMAS">
                <xs:complexType>
                    <xs:sequence>
                        <xs:element name="SCHEMA" maxOccurs="unbounded">
                            <xs:complexType>
                                <xs:complexContent>
                                    <xs:extension base="ns1:NamedBase">
                                        <xs:choice>
                                            <xs:element name="SOURCE" type="xs:anyURI">
                                                <xs:annotation>
```

```
                                <xs:documentation>Path to schema defined in an
external file</xs:documentation>
                            </xs:annotation>
                        </xs:element>
                        <xs:element ref="xs:schema"/>
                    </xs:choice>
                </xs:extension>
            </xs:complexContent>
        </xs:complexType>
    </xs:element>
</xs:sequence>
</xs:complexType>
<xs:key name="UniqueSchema">
    <xs:selector xpath="SCHEMA"/>
    <xs:field xpath="@name"/>
</xs:key>
</xs:element>
<xs:element name="FUNCTIONS" minOccurs="0">
    <xs:complexType>
        <xs:choice>
            <xs:element ref="ns1:FUNCTION_DEF" maxOccurs="unbounded"/>
            <xs:element name="FUNCTION" maxOccurs="unbounded">
                <xs:annotation>
                    <xs:documentation>Parsed function
definition</xs:documentation>
                </xs:annotation>
                <xs:complexType>
                    <xs:complexContent>
                        <xs:extension base="ns1:NamedBase">
                            <xs:sequence>
                                <xs:element ref="ns1:FUNCTION_DEF"/>
                                <xs:element name="PARAMETERS">
                                    <xs:complexType>
                                        <xs:sequence>
```

```xml
                                    <xs:element name="PARAMETER" minOccurs="0" maxOccurs="unbounded">
                                      <xs:complexType>
                                        <xs:attribute name="name" type="xs:NCName" use="required"/>
                                        <xs:attribute name="type" type="ns1:InformationType" use="required"/>
                                        <xs:attribute name="isOptional" type="xs:boolean" use="optional" default="false"/>
                                      </xs:complexType>
                                    </xs:element>
                                  </xs:sequence>
                                </xs:complexType>
                              </xs:element>
                              <xs:element name="BODY" type="ns1:ParsedExpression"/>
                            </xs:sequence>
                            <xs:attribute name="returnType" type="ns1:InformationType" use="required"/>
                          </xs:extension>
                        </xs:complexContent>
                      </xs:complexType>
                    </xs:element>
                  </xs:choice>
                </xs:complexType>
                <xs:unique name="UniqueFunction">
                  <xs:selector xpath="FUNCTION"/>
                  <xs:field xpath="@name"/>
                </xs:unique>
              </xs:element>
              <xs:element name="RESTRICTIONS" minOccurs="0">
                <xs:complexType>
                  <xs:sequence>
                    <xs:element name="RESTRICTION" maxOccurs="unbounded">
```

```
                <xs:complexType>
                    <xs:complexContent>
                        <xs:extension base="ns1:NamedBase">
                            <xs:sequence>
                                <xs:element name="XPATH" type="ns1:XPath"/>
                                <xs:choice>
                                    <xs:element ref="xs:key"/>
                                    <xs:element ref="xs:unique"/>
                                </xs:choice>
                            </xs:sequence>
                            <xs:attribute name="op" type="ns1:RestrictionOperation" use="required"/>
                        </xs:extension>
                    </xs:complexContent>
                </xs:complexType>
            </xs:element>
        </xs:sequence>
    </xs:complexType>
    <xs:key name="UniqueRestriction">
        <xs:selector xpath="RESTRICTION"/>
        <xs:field xpath="@name"/>
    </xs:key>
</xs:element>
<xs:element name="RELATIONSHIPS" minOccurs="0">
    <xs:complexType>
        <xs:sequence>
            <xs:element name="RELATIONSHIP" maxOccurs="unbounded">
                <xs:complexType>
                    <xs:complexContent>
                        <xs:extension base="ns1:NamedBase">
                            <xs:sequence>
                                <xs:element name="SOURCE" type="ns1:XPath"/>
                                <xs:element name="DESTINATION" type="ns1:XPath"/>
```

```
                </xs:sequence>
              </xs:extension>
            </xs:complexContent>
          </xs:complexType>
        </xs:element>
      </xs:sequence>
    </xs:complexType>
    <xs:unique name="UniqueRelationship">
      <xs:selector xpath="RELATIONSHIP"/>
      <xs:field xpath="@name"/>
    </xs:unique>
  </xs:element>
  <xs:element name="LOOKUPS" minOccurs="0">
    <xs:complexType>
      <xs:sequence>
        <xs:element name="LOOKUP" maxOccurs="unbounded">
          <xs:complexType>
            <xs:complexContent>
              <xs:extension base="ns1:NamedBase">
                <xs:sequence>
                  <xs:element name="ROOT" type="ns1:XPath"/>
                  <xs:element name="DEFAULT" type="xs:string" minOccurs="0"/>
                  <xs:choice minOccurs="0">
                    <xs:element name="FILE">
                      <xs:complexType>
                        <xs:attribute name="url" type="xs:anyURI" use="required"/>
                        <xs:attribute name="reader" type="xs:NCName" use="opional"/>
                        <xs:attribute name="readerType" type="ns1:ReaderType" use="required"/>
                      </xs:complexType>
                    </xs:element>
```

```
                    <xs:element name="DB">
                        <xs:complexType>
                            <xs:attribute name="connectionString" type="xs:string" use="required"/>
                            <xs:attribute name="query" type="xs:string" use="required"/>
                        </xs:complexType>
                    </xs:element>
                    <xs:any namespace="##other" processContents="skip" maxOccurs="unbounded">
                        <xs:annotation>
                            <xs:documentation>Here comes XML for lookup information</xs:documentation>
                        </xs:annotation>
                    </xs:any>
                </xs:choice>
            </xs:sequence>
        </xs:extension>
    </xs:complexContent>
</xs:complexType>
                    </xs:element>
                </xs:sequence>
            </xs:complexType>
            <xs:unique name="UniqueLookup">
                <xs:selector xpath="LOOKUP"/>
                <xs:field xpath="@name"/>
            </xs:unique>
        </xs:element>
        <xs:element name="OVERRIDES" minOccurs="0">
            <xs:complexType>
                <xs:sequence>
                    <xs:element name="OVERRIDE" maxOccurs="unbounded">
                        <xs:complexType mixed="true">
                            <xs:complexContent mixed="true">
```

```
                <xs:extension base="ns1:NamedBase"/>
            </xs:complexContent>
        </xs:complexType>
        <xs:key name="UniqueOverride">
            <xs:selector xpath="OVERRIDE"/>
            <xs:field xpath="@name"/>
        </xs:key>
    </xs:element>
        </xs:sequence>
    </xs:complexType>
</xs:element>
<xs:element name="MAPPERS">
    <xs:complexType>
        <xs:sequence>
            <xs:element name="MAPPER">
                <xs:complexType>
                    <xs:complexContent>
                        <xs:extension base="ns1:NamedBase">
                            <xs:sequence>
                                <xs:element name="ROOTS">
                                    <xs:complexType>
                                        <xs:sequence>
                                            <xs:element name="ROOT" type="ns1:XPath" maxOccurs="unbounded"/>
                                        </xs:sequence>
                                    </xs:complexType>
                                </xs:element>
                                <xs:element name="OUTPUTS" minOccurs="0">
                                    <xs:complexType>
                                        <xs:sequence>
                                            <xs:element name="OUTPUT" type="xs:anyURI" maxOccurs="unbounded"/>
                                        </xs:sequence>
                                    </xs:complexType>
```

```xml
                </xs:element>
                <xs:element name="MAPPING_GROUPS">
                    <xs:complexType>
                        <xs:sequence>
                            <xs:group ref="ns1:MappingGroupChoice" maxOccurs="unbounded"/>
                        </xs:sequence>
                    </xs:complexType>
                </xs:element>
            </xs:sequence>
        </xs:extension>
    </xs:complexContent>
</xs:complexType>
                </xs:element>
            </xs:sequence>
        </xs:complexType>
    </xs:element>
</xs:sequence>
<xs:attribute name="name" type="xs:NCName" use="required"/>
<xs:attribute name="URL" type="xs:anyURI" use="optional">
    <xs:annotation>
        <xs:documentation>Path of the file that was source for this script</xs:documentation>
    </xs:annotation>
</xs:attribute>
<xs:attribute name="sourceType" type="ns1:WorkspaceType" use="required"/>
<xs:attribute name="sourceFormat" type="xs:string" use="optional">
    <xs:annotation>
        <xs:documentation>Specifies the the name of the parser that produced this XML</xs:documentation>
    </xs:annotation>
</xs:attribute>
        </xs:complexType>
    </xs:element>
</xs:schema>
```

The following examples show the mapping specification that uses the information for lookup. The specification takes a list of <state, city> pairs as input, and produces for each city its area and population as percentage of corresponding state value:

```
<?xml version="1.0" encoding="UTF-8"?>
<WORKSPACE xmlns=
"http://www.itemfield.com/ContentMaster/Mapper"
xmlns:xsi="http://www.w3.org/2001/XMLSchema-instance"
xsi:schemaLocation="http://www.itefield.com/ContentMaster/Mapper
C:\DOCUME~1\avri\MYDOCU~1\ItemField\Projects\
IFCMMapperBuilderConsole\IFCMMapperBuilderModel\
InputMapper.xsd" name="Lookup2"
sourceType="CM_EXCEL">
  <SCHEMAS>
    <SCHEMA name="INPUT">
      <SOURCE>Lookup2-input</SOURCE>
    </SCHEMA>
    <SCHEMA name="OUTPUT">
      <SOURCE>Lookup2-output</SOURCE>
    </SCHEMA>
    <SCHEMA name="GeoInformation">
      <SOURCE>Lookup2</SOURCE>
    </SCHEMA>
  </SCHEMAS>
  <RESTRICTIONS>
  <RESTRICTIONS>
    <RESTRICTION name="UniqueState" op="add">
      <XPATH>/GeoInformation</XPATH>
      <xs:key name="UniqueState">
        <xs:selector xpath="STATE"/>
        <xs:field xpath="@name"/>
      </xs:key>
    </RESTRICTION>
    <RESTRICTION name="UniqueStateCity" op="add">
      <XPATH>/GeoInformation</XPATH>
      <xs:key name="UniqueStateCity">
        <xs:selector xpath="STATE/CITY"/>
        <xs:field xpath="../@name"/>
        <xs:field xpath="@name"/>
      </xs:key>
    </RESTRICTION>
  </RESTRICTIONS>
  <LOOKUPS>
    <LOOKUP name="GeoInformation">
      <ROOT>/GeoInformation</ROOT>
      <FILE url="Lookup2-information" readerType="builder"/>
    </LOOKUP>
  </LOOKUPS>
  <MAPPERS>
    <MAPPER name="Lookup2">
      <ROOTS>
        <ROOT>/OUTPUT</ROOT>
      </ROOTS>
      <MAPPING_GROUPS>
        <TRANSACTIONAL_GROUP>
          <MAP>
            <DESTINATION>/OUTPUT/CITY/@area</DESTINATION>
            <VALUE>
              <EXPRESSION_DEF>
          MULTIPLY(
            DIVIDE(LOOKUP("GeoInformation", "UniqueStateCity",
                "/GeoInformation/STATE/CITY/@area",
                VALUEOF("/INPUT/CITY/@state"),
                VALUEOF("/INPUT/CITY/@name")),
              LOOKUP("GeoInformation", "UniqueState",
                "/GEOINFORMATION/STATE/@AREA",
                VALUEOF("/INPUT/CITY/@state"))),
              100)
              </EXPRESSION_DEF>
            </VALUE>
          </MAP>
          <MAP>
            <DESTINATION>/OUTPUT/CITY/@population</DESTINATION>
            <VALUE>
              <EXPRESSION_DEF>
          MULTIPLY(
            DIVIDE(LOOKUP("GeoInformation", "UniqueStateCity",
                "/GeoInformation/STATE/CITY/@population",
                VALUEOF("/INPUT/CITY/@state"),
                VALUEOF("/INPUT/CITY/@name")),
              LOOKUP("GeoInformation", "UniqueState",
                "/GeoInformation/STATE/@population",
                VALUEOF("/INPUT/CITY/@state"))),
              100)
              </EXPRESSION_DEF>
            </VALUE>
          </MAP>
        </TRANSACTIONAL_GROUP>
      </MAPPING_GROUPS>
    </MAPPER>
  </MAPPERS>
</WORKSPACE>
```

It is noted that the schema and information are defined in external files. Accordingly, there is no need to add a separate namespace. The key definitions are under the RESTRICTIONS element, and not in the schema. Multiple keys are defined on the same information, and used in separate calls to LOOKUP() function. Values returned by the LOOKUP() function are used in calculation.

We claim:

1. A method for converting information, the method comprises the following stages executed by a processor:
converting a non-structured information transformation specification to a structured information transformation specification;
generating information transformation code responsive to the structured information transformation specification;
altering the information transformation code; and
associating a code alteration indication to the non-structured information transformation specification in response to the alteration of the information transformation code, the associating further comprising:
performing a conversion of the information transformation code to a format compatible with the structured information transformation specification to generate an intermediate code alteration; and
performing a conversion of the intermediate code alteration to a format compatible with the non-structured information transformation specification to generate the code alteration indication.

2. The method according to claim 1 wherein the code alteration indication affects the non-structured information transformation specification.

3. The method according to claim 1 further comprising determining if the alteration of the information transformation code can be converted to a non-structured information specification conversion format.

4. The method according to claim 1 wherein the non-structured information transformation specification is a spreadsheet format information transformation specification.

5. The method according to claim 1 further comprises providing indications of recommended non-structured information transformation specification rules.

6. The method according to claim 1 further comprises generating non-structured information transformation specification shortcuts.

7. The method according to claim 1 further comprising storing versions of the information transformation code and determining an alteration by comparing between at least two versions of the information transformation code.

8. The method according to claim 1 further comprising storing versions of the structured information transformation specification and determining an alteration by comparing between at least two versions of the structured information transformation specification.

9. The method according to claim 1 further comprising storing versions of the non-structured information transformation specification and determining an alteration by comparing between at least two versions of the non-structured information transformation specification.

10. The method according to claim 1 further comprising altering the non-structured information transformation specification and attempting to generate a structured information transformation specification that represents the altered non-structured information transformation specification.

11. The method according to claim 1 wherein the structured information transformation specification comprises a MAPPERS element.

12. The method according to claim 1 wherein the structured information transformation specification comprises a LOOKUPS element.

13. The method according to claim 1 wherein the structured information transformation specification comprises an OVERRIDE element.

14. A computer readable medium that stores code executable by a processor that causes a computer to: convert the non-structured information transformation specification to a structured information transformation specification; generate information transformation code responsive to the structured information transformation specification, alter the information transformation code, and associate a code alteration indication to the non-structured information transformation specification in response to the alteration of the information transformation code, the association further comprising performing a conversion of the information transformation code to a format compatible with the structured information transformation specification to generate an intermediate code alteration, and performing a conversion of the intermediate code alteration to a format compatible with the non-structured information transformation specification to generate the code alteration indication.

15. The computer readable medium according to claim 14 wherein the code alteration indication affects the non-structured information transformation specification.

16. The computer readable medium according to claim 14 wherein the code further causes the computer to determine if the alteration of the information transformation code can be converted to a non-structured information specification conversion format.

17. The computer readable medium according to claim 14 wherein the non-structured information transformation specification is a spreadsheet format information transformation specification.

18. The computer readable medium according to claim 14 wherein the code further causes the computer to provide indications of recommended non-structured information transformation specification rules.

19. The computer readable medium according to claim 14 wherein the code further causes the computer to generate non-structured information transformation specification shortcuts.

20. The computer readable medium according to claim 14 wherein the code further causes the computer to store versions of the information transformation code and determine an alteration by comparing between at least two versions of the information transformation code.

21. The computer readable medium according to claim 14 wherein the code further causes the computer to store versions of the structured information transformation specification and determine an alteration by comparing between at least two versions of the structured information transformation specification.

22. The computer readable medium according to claim 14 wherein the code further causes the computer to store versions of the non-structured information transformation specification and determine an alteration by comparing between at least two versions of the non-structured information transformation specification.

23. The computer readable medium according to claim 14 wherein the code further causes the computer to alter the non-structured information transformation specification and to attempt to generate a structured information transformation specification that represents the altered non-structured information transformation specification.

24. The computer readable medium according to claim 14 wherein the structured information transformation specification comprises a MAPPERS element.

25. The computer readable medium according to claim 14 wherein the structured information transformation specification comprises a LOOKUPS element.

26. The computer readable medium according to claim 14 wherein the structured information transformation specification comprises an OVERRIDE element.

27. An information converter, comprising:
an input for receiving non-structured information transformation specification; and
a processor adapted to perform executable instructions comprising:
(i) converting the non-structured information transformation specification to a structured information transformation specification;
(ii) generating information transformation code responsive to the structured information transformation specification;
(iii) altering the information transformation code; and
(iv) associating a code alteration indication to the non-structured information transformation specification in response to the alteration of the information transformation code, the associating further comprising:
performing a conversion of the information transformation code to a format compatible with the structured information transformation specification to generate an intermediate code alteration; and
performing a conversion of the intermediate code alteration to a format compatible with the non-structured information transformation specification to generate the code alteration indication.

* * * * *